US009430841B2

(12) United States Patent
Yokoyama

(10) Patent No.: US 9,430,841 B2
(45) Date of Patent: Aug. 30, 2016

(54) DEFECT INSPECTION METHOD

(71) Applicant: TOKYO WELD CO., LTD., Tokyo-to (JP)

(72) Inventor: Yoshihiko Yokoyama, Tokyo-to (JP)

(73) Assignee: TOKYO WELD CO., LTD., Tokyo (JP)

( * ) Notice: Subject to any disclaimer, the term of this patent is extended or adjusted under 35 U.S.C. 154(b) by 0 days.

(21) Appl. No.: 14/308,092

(22) Filed: Jun. 18, 2014

(65) Prior Publication Data
US 2014/0376818 A1 Dec. 25, 2014

(30) Foreign Application Priority Data

Jun. 19, 2013 (JP) .................................. 2013-128832

(51) Int. Cl.
*G06T 7/00* (2006.01)
*G06K 9/46* (2006.01)
(52) U.S. Cl.
CPC ............ *G06T 7/0085* (2013.01); *G06K 9/4638* (2013.01); *G06T 7/0004* (2013.01); *G06T 7/0091* (2013.01); *G06T 2207/20136* (2013.01)
(58) Field of Classification Search
None
See application file for complete search history.

(56) References Cited

U.S. PATENT DOCUMENTS

| 2002/0015508 A1* | 2/2002 | Hannigan et al. ............. 382/100 |
| 2006/0126093 A1* | 6/2006 | Fedorovskaya et al. ...... 358/1.14 |
| 2009/0154792 A1* | 6/2009 | Sun ........................... G06T 5/20 382/154 |

OTHER PUBLICATIONS

European Search Report issued in EP Appliction No. 14002109.8-1906, dated Nov. 19, 2014 (in English).
Sinha S.K., et al., "Automated Detection of Cracks in Buried Concrete Pipe Images", Automation in Construction, Elsevier Science Publishers, Amsterdam, NL, vol. 15, No. 1, Jan. 1, 2006 (pp. 58-72).
V. Conti, et al., "Morphological Enhancement and Triangular Matching for Fingerprint Recognition," Innovations and Advanced Techniques in Systems, Computing Sciences and Software Engineering, Jan. 1, 2008, Springer Netherlands, Dordrecht.
Taiwanese Office Action, dated May 22, 2015, for Taiwanese Application No. 103118815 with English translation.

* cited by examiner

*Primary Examiner* — Kim Vu
*Assistant Examiner* — Nathan Bloom
(74) *Attorney, Agent, or Firm* — Birch, Stewart, Kolasch & Birch, LLP

(57) ABSTRACT

There is provided a defect inspection method capable of detecting a crack with high accuracy. The defect inspection method includes the steps of: obtaining a shot image comprising pixels; and scanning the shot image in predetermined directions, and assigning a high evaluation value to a pixel M for each scanning direction when the luminance of the pixel M is lower than the luminances of first adjacent pixels K, O, located on both sides of the pixel M in the scanning direction and, in addition, the luminance of each of second adjacent pixels C, W, located on both sides of the pixel M in a direction perpendicular to the scanning direction, is lower than the luminances of third adjacent pixels A, E or U, Y located on both sides of the second adjacent pixel in the scanning direction. The method also includes the steps of selecting selection pixels based on the evaluation values of the pixels for each scanning direction; connecting the selection pixels for each scanning direction; and synthesizing the selection pixels of the predetermined scanning directions, and removing those pixels which do not meet the requirement for a predetermined shape from the selection pixels.

11 Claims, 25 Drawing Sheets

0-DEGREE DIRECTION COMPONENT RESULTS OF EVALUATION (a)

45-DEGREE DIRECTION COMPONENT RESULTS OF EVALUATION (b)

90-DEGREE DIRECTION COMPONENT RESULTS OF EVALUATION

C2

(c)

135-DEGREE DIRECTION COMPONENT RESULTS OF EVALUATION

C2

(d)

0-DEGREE DIRECTION COMPONENT
RESULTS OF MULTISTAGE SELECTION (a)

45-DEGREE DIRECTION COMPONENT
RESULTS OF MULTISTAGE SELECTION (b)

90-DEGREE DIRECTION COMPONENT
RESULTS OF MULTISTAGE SELECTION

C2

(c)

135-DEGREE DIRECTION COMPONENT
RESULTS OF MULTISTAGE SELECTION

C2

(d)

RESULTS OF SELECTION FOR 0-DEGREE DIRECTION COMPONENT (a)

RESULTS OF SELECTION FOR 45-DEGREE DIRECTION COMPONENT (b)

RESULTS OF SELECTION FOR 90-DEGREE DIRECTION COMPONENT (c)

RESULTS OF SELECTION FOR 135-DEGREE DIRECTION COMPONENT (d)

0-DEGREE DIRECTION (a)

45-DEGREE DIRECTION (b)

90-DEGREE DIRECTION (c)

135-DEGREE DIRECTION (d)

INPUT IMAGE            RESULTS OF INSPECTION (a)            (b)

IMAGE OF A CRACK EASY TO DETECT — C1 — (a)

IMAGE OF A CRACK DIFFICULT TO DETECT — C2 — (b)

DEFECT INSPECTION METHOD

CROSS-REFERENCE TO RELATED APPLICATION

This application claims the priority benefit of Japanese Patent Application No. 2013-128832, filed on Jun. 19, 2013, the disclosure of which is incorporated herein by reference in its entirety.

TECHNICAL FIELD

The present invention relates to a method for detecting a linear defect, called a crack, from a shot image of the surface of an inspection object, and more particularly to a defect inspection method capable of detecting a crack with high accuracy under conditions in which crack-related pixels are difficult to discern from pixels unrelated to a crack.

BACKGROUND ART

A defect inspection method is known which detects a linear defect, called a crack, from a shot image of the surface of an inspection object. FIG. 20 shows a flow chart of the conventional defect inspection method.

As shown in FIG. 20, the "likelihood of crack" is evaluated for all the pixels of a shot image as an input image according to a predetermined evaluation criterion, and highly evaluated pixels are extracted (step S101). Next, pixels having a high "likelihood of crack" are selected from the highly evaluated pixels using a predetermined threshold value (step S102). Of the selected pixels, those portions which are discontinuous but can be estimated to be actually continuous are subjected to connection processing to connect the pixels and regenerate the shape of a crack (step S103). Lastly, a group(s) of pixels, which is determined to be of a noise(s) based on threshold values set according to shape characteristics such as the size (width and length), the area (number of pixels), the ratio between the width and the length, etc., is removed from the selected pixels (step S104).

For example, an appropriate discrimination and choice can be made between a circular group of pixels and a linear group of pixels, both groups having the same area value, by making the determination based on the width/length ratio.

The above-described four steps are called an evaluation step, a selection step, a connection step and a correction step, as also described in FIG. 20.

The above-described conventional defect inspection method has the following problems: FIGS. 21(a) and 21(b) each show an image of an exemplary crack. In each image, a crack appears dark (black) on a bright (white) background. The crack C1 of FIG. 21(a) is a wide crack which is easy to detect.

On the other hand, the crack C2 of FIG. 21(b) is a narrow crack, which is difficult to discern from non-defective point-like or short linear patterns or irregularities existing in the background. Thus, the crack C2 is difficult to detect.

When the conventional method is used to detect a crack which is difficult to detect, such as the crack C2 shown in FIG. 21(b), there is a high possibility of the occurrence of false detection for the following reasons:

The conventional method has the following problems when a pixel luminance value is used as the "predetermined evaluation criterion" described in the step S101 of FIG. 20 and the "predetermined threshold value" described in the step S102 is used.

FIG. 22(a) illustrates a case in which because of a loose threshold value, a noise is falsely detected as a crack (non-defective object is falsely determined to be defective). FIG. 22(b) illustrates a case in which because of a strict threshold value, pixels of a crack are overlooked (defective object is falsely determined to be non-defective). FIG. 22(c) illustrates a case in which pixels having a luminance of not more than the threshold value 160, which is determined to be the optimal threshold value for the image to be inspected, are selected as pixels of a crack.

However, even in the case shown in FIG. 22(c), it is still possible that a noise may be falsely detected as a crack, or pixels of a crack may be overlooked. The crack inspection method, performed by using a luminance value in a simple manner, is thus largely affected by a noise, which makes it difficult to determine an optimal threshold value.

Further, the "threshold value 160" of FIG. 22(c) is subjectively determined to be the optimal threshold value for the image to be inspected for the first time after trying various luminance values as threshold values. Thus, the luminance value 160 is not always the optimal threshold value for other images to be inspected. It is, however, difficult in principle and in view of the processing time to determine an optimal threshold value for every image to be inspected. Therefore, it is common practice to determine a particular threshold value in advance, allowing for some degree of false detection of a noise and false determination of a non-defective object to be defective, and to perform a series of inspections of images based on the threshold value.

FIGS. 23(a) and 23(b) show a summary of the above-described problems of the conventional defect inspection method.

As shown in FIGS. 23(a) and 23(b), when an area with a luminance value of not less than a low threshold value Thl is selected as a selection area L, the area L consists of an area 2 where a portion of a crack and noises co-exist, and an area 3 which is substantially occupied by the crack. Therefore, pixels to be selected as crack-related pixels can be securely selected without being overlooked. On the other hand, many noises are also selected. Thus, while there are few crack-related pixels which are overlooked, the selection is of low "likelihood of crack".

When an area with a luminance value of not less than a high threshold value Thh is selected as a selection area H, the area H consists solely of the area 3 which is substantially occupied by the crack. Accordingly, not a few pixels, which are to be selected as crack-related pixels, will be overlooked. Further, few noises will be selected. Thus, while there are a considerable number of crack-related pixels which are overlooked, the selection is of high "likelihood of crack".

There is another problem which is due to no knowledge of a direction in which a crack is formed. In the present invention the accuracy of inspection of a crack increases as the scanning direction Ax comes near to a direction perpendicular to a direction in which the crack is formed, as shown in FIG. 24(a). On the other hand, the accuracy of inspection of a crack decreases as the scanning direction Ax comes near to a direction parallel to a direction in which the crack is formed, as shown in FIG. 24(b). The accuracy of inspection of a crack thus depends on the scanning direction. If a direction in which a crack is formed is known in advance, the inspection ability, in some cases, can be enhanced by making use of information on the direction of the crack as in the below-described connection processing.

However, a direction in which a crack is formed is actually rarely known in advance. If a direction in which a crack is formed is determined by visual observation before determining the scanning direction Ax, the inspection efficiency will be low. In addition, a fine crack(s) that has been overlooked in the visual observation will not be detected. The accuracy of detection will be high if a direction in which a crack is formed is determined by image processing of a shot image, and scanning is performed in a direction perpendicular to the determined direction. This method, however, may require a complicated image processing program and a long inspection time.

FIGS. 25(a) and 25(b) illustrate connection processing. In FIGS. 25(a) and 25(b), Cc1 to Cc3 and Cd1 to Cd3 denote pixel groups obtained as a result of evaluation processing and selection processing as performed in a conventional manner. The pixel groups Cc1 to Cc3, extending in a direction which is nearly parallel to the direction Cx of connection processing, are connected into a single linear shape by the connecting effect. The exact original shape of the crack is thus regenerated. On the other hand, the pixel groups Cd1 to Cd3, extending in a direction which is nearly perpendicular to the direction Cx of connection processing, are little subject to the connecting effect and remain discontinuous. Thus, the exact original shape of the crack cannot be regenerated.

Therefore, if a direction in which a crack is formed is not known in advance, the connection processing needs to be performed in all directions. However, such all-direction connection processing is undesirable because of the possibility of connecting the crack with surrounding noises. In particular, connection processing as performed in a direction perpendicular to a crack, as shown in FIG. 25(b), causes problems such as broadening of the width of the crack, a change in the shape of the crack due to coalescence of the crack and an adjacent noise(s), etc.

Thus, how to utilize information on the direction of a crack has been a significant problem in the prior art.

SUMMARY OF THE INVENTION

The present invention has been made in view of the above situation. It is therefore an object of the present invention to provide a defect inspection method capable of detecting a crack with high accuracy under conditions in which crack-related pixels are difficult to discern from pixels unrelated to a crack, e.g. when the crack is a very narrow one or when non-defective point-like or short linear patterns or irregularities exist in the background of the inspection object.

In order to achieve the object, the present invention provides a defect inspection method comprising the steps of: shooting the surface of an inspection object to obtain a shot image comprising pixels; scanning the shot image in predetermined directions using a dedicated scanning filter for each direction, and assigning a high evaluation value to a pixel of the shot image for each scanning direction when the luminance of the pixel is higher than the luminances of first adjacent pixels located on both sides of the pixel in the scanning direction and, in addition, the luminance of each of second adjacent pixels, located on both sides of the pixel in a direction perpendicular to the scanning direction, is higher than the luminances of third adjacent pixels located on both sides of the second adjacent pixel in the scanning direction; selecting selection pixels based on the evaluation values of the pixels for each scanning direction; connecting the selection pixels for each scanning direction; and synthesizing the selection pixels of the predetermined scanning directions, and removing those pixels which do not meet the requirement for a predetermined shape from the selection pixels.

The present invention also provides a defect inspection method comprising the steps of: shooting the surface of an inspection object to obtain a shot image comprising pixels; scanning the shot image in predetermined directions using a dedicated scanning filter for each direction, and assigning a high evaluation value to a pixel of the shot image for each scanning direction when the luminance of the pixel is lower than the luminances of first adjacent pixels located on both sides of the pixel in the scanning direction and, in addition, the luminance of each of second adjacent pixels, located on both sides of the pixel in a direction perpendicular to the scanning direction, is lower than the luminances of third adjacent pixels located on both sides of the second adjacent pixel in the scanning direction; selecting selection pixels based on the evaluation values of the pixels for each scanning direction; connecting the selection pixels for each scanning direction; and synthesizing the selection pixels of the predetermined scanning directions, and removing those pixels which do not meet the requirement for a predetermined shape from the selection pixels.

In a preferred embodiment of the present invention, in the step of selecting selection pixels, pixels having an evaluation value higher than a first threshold value are selected as primary selection pixels, and pixels having an evaluation value higher than a second threshold value which is lower than the first threshold value are selected as secondary selection pixels, and, of the secondary selection pixels, those pixels which lie adjacent to the primary selection pixels and those pixels which lie adjacent to the adjacent pixels are changed to primary selection pixels.

In a preferred embodiment of the present invention, in the step of connecting the selection pixels, the selection pixels are connected by carrying out expansion processing or contraction processing.

In a preferred embodiment of the present invention, the dedicated scanning filter is a 0-degree direction scanning filter, a 45-degree direction scanning filter, a 90-degree direction scanning filter or a 135-degree direction scanning filter.

The present invention makes it possible to detect a crack with high accuracy even when crack-related pixel are difficult to discern from pixels unrelated to a crack.

DETAILED DESCRIPTION OF THE PREFERRED EMBODIMENTS

Preferred embodiments of the present invention will now be described in detail with reference to the drawings.

FIGS. 1 through 19 are diagrams illustrating a defect inspection method according to an embodiment of the present invention.

At the outset, an outline of the defect inspection method according to the present invention will be described with reference to FIG. 1.

Figure 1A:
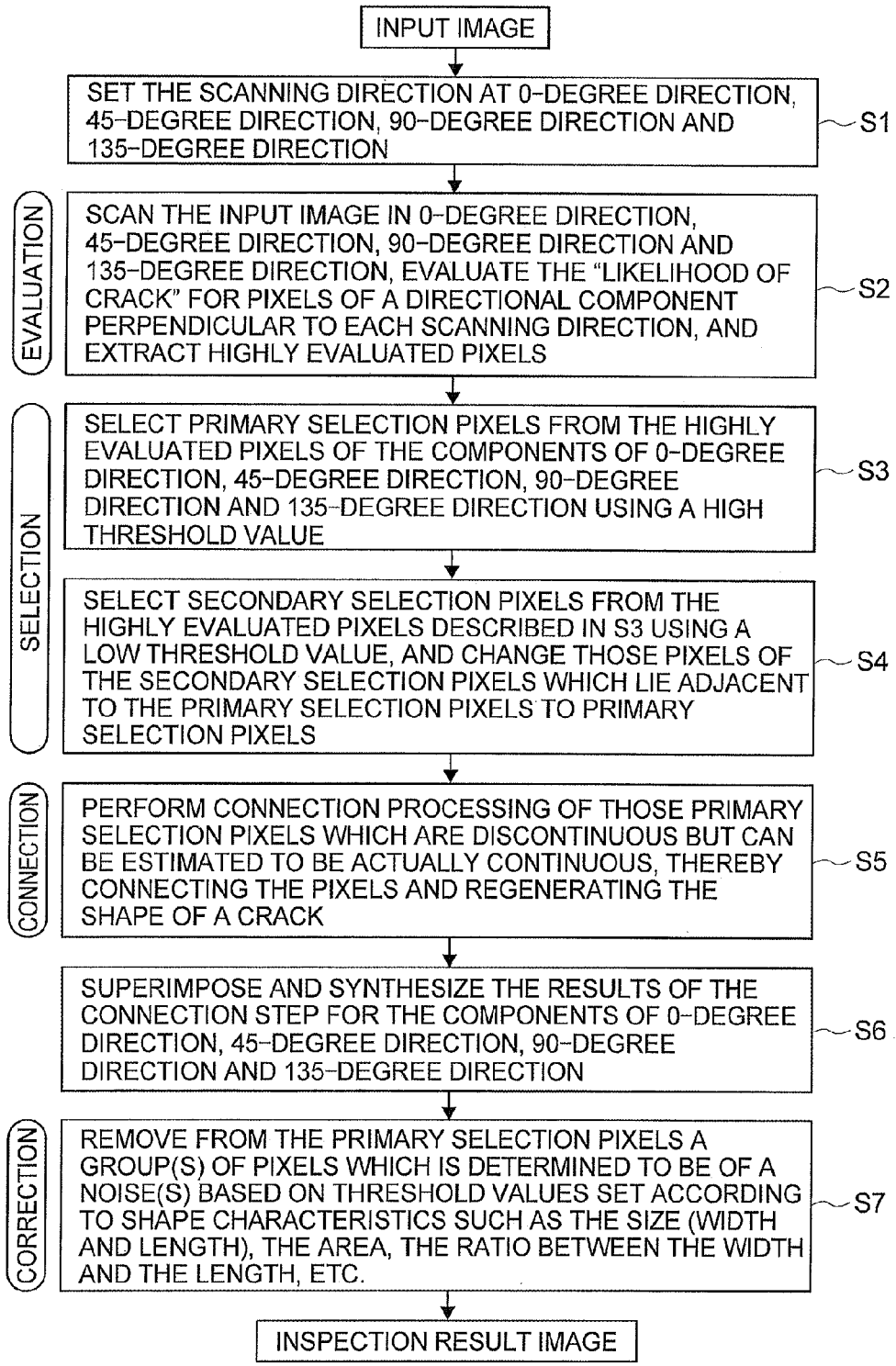
FIGS. 1A-1B are flow charts of a defect inspection method according to the present invention.
Figure 1B:
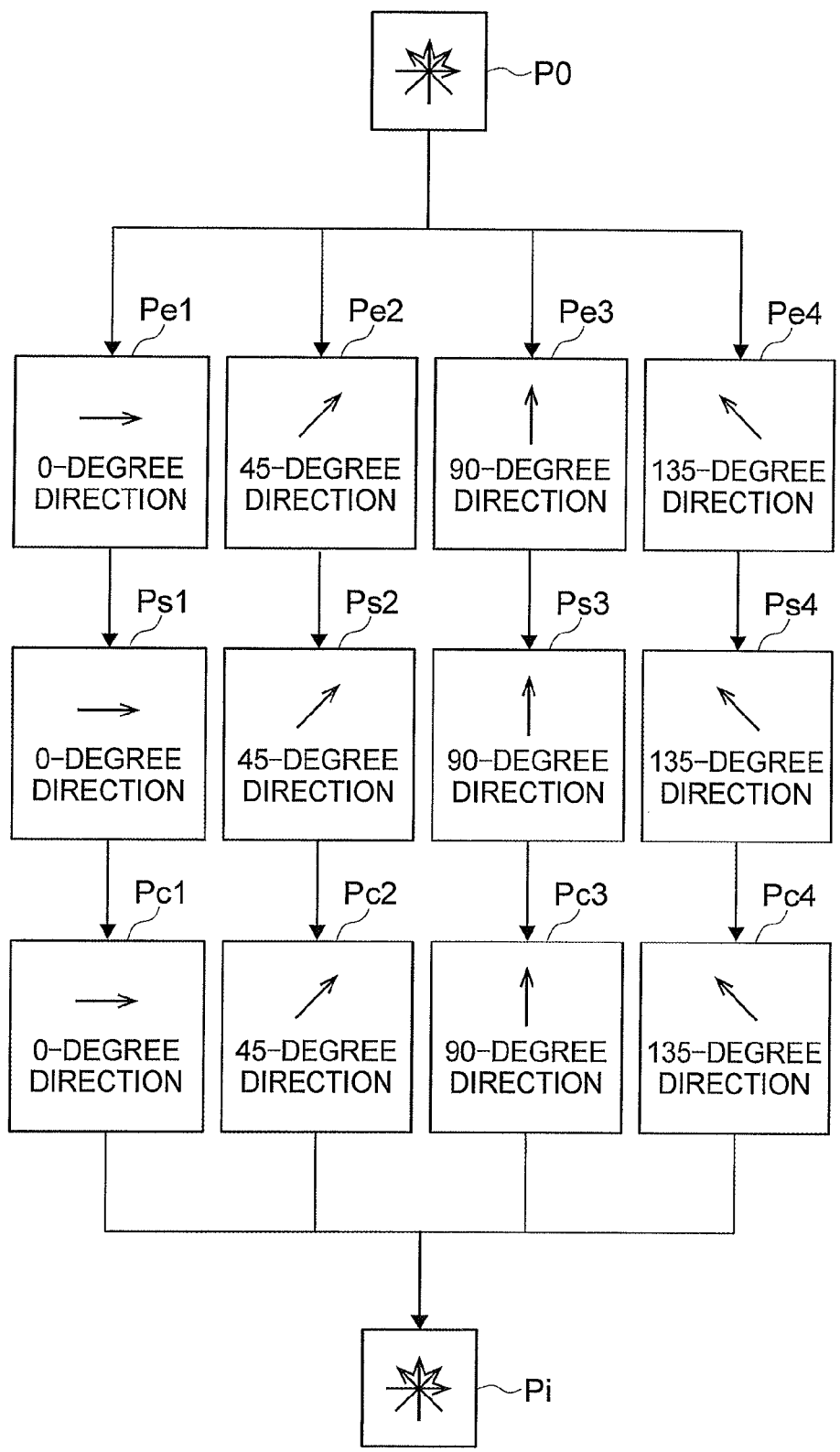

As illustrated in FIG. 1, the defect inspection method according to the present invention is to inspect a defect, such as a crack, in an inspection object.

The defect inspection method includes the steps of: shooting the surface of an inspection object to obtain a shot image (input image) P0 comprising pixels; scanning the shot image P0 in predetermined directions using a dedicated scanning filter for each direction (step S1), and assigning a high evaluation value to a pixel of the shot image P0 for each scanning direction when the luminance of the pixel differs from the luminances of first adjacent pixels located on both sides of the pixel in the scanning direction and, in addition, the luminance of each of second adjacent pixels, located on both sides of the pixel in a direction perpendicular to the scanning direction, differs from the luminances of third adjacent pixels located on both sides of the second adjacent pixel in the scanning direction (evaluation step S2); selecting selection pixels based on the evaluation values of the pixels for each scanning direction (selection steps S3, S4); connecting the selection pixels for each scanning direction (connection step S5); and synthesizing the selection pixels of the predetermined scanning directions, and removing those pixels which do not meet the requirement for a predetermined shape from the selection pixels.

In the step S1, the predetermined scanning directions for the shot image P0 are, for example, 0-degree direction, 45-degree direction, 90-degree direction and 135-degree direction; the dedicated scanning filter is a 0-degree direction scanning filter, a 45-degree direction scanning filter, a 90-degree direction scanning filter or a 135-degree direction scanning filter.

In the step of assigning an evaluation value to each pixel for each scanning direction (evaluation step S2), a pixel is determined to have a high "likelihood of crack" and is assigned a high evaluation value when the luminance of the pixel is lower than the luminance of the first adjacent pixels and, in addition, the luminance of each of the second adjacent pixels is lower than the luminances of the third adjacent pixels.

Images Pe1, Pe2, Pe3 and Pe4, each consisting of pixels with assigned evaluation values, are thus obtained for the respective scanning directions.

In another embodiment, in the step of assigning an evaluation value to each pixel for each scanning direction (evaluation step S2), a pixel is determined to have a high "likelihood of crack" and is assigned a high evaluation value when the luminance of the pixel is higher than the luminances of the first adjacent pixels and, in addition, the luminance of each of the second adjacent pixels is higher than the luminances of the third adjacent pixels, as will be described later.

In the step of selecting selection pixels for each scanning direction, pixels having an evaluation value higher than a first threshold value are selected as primary selection pixels (step S3), and pixels having an evaluation value higher than a second threshold value which is lower than the first threshold value are selected as secondary selection pixels, and, of the secondary selection pixels, those pixels which lie adjacent to the primary selection pixels and those pixels which lie adjacent to the adjacent pixels are changed to primary selection pixels (step S4).

Images Ps1, Ps2, Ps3 and Ps4, each consisting of selected pixels, are thus obtained for the respective scanning directions.

In the step S5 of connecting the selection pixels, the selection pixels are connected by carrying out the below-described expansion processing or contraction processing. Of the primary selection pixels of the 0-degree direction component, the 45-degree direction component, the 90-degree direction component and the 135-degree direction component, those portions which are discontinuous but can be estimated to be actually continuous are subjected to connection processing to connect the pixels and regenerate the shape of a crack. Images Pc1, Pc2, Pc3 and Pc4, each consisting of pixels that have undergone the connection processing, are thus obtained for the respective scanning directions.

In the subsequent synthesis step S6, the results of the connection processing for the 0-degree direction component, the 45-degree direction component, the 90-degree direction component and the 135-degree direction component are superimposed and synthesized.

In the correction step S7, a group(s) of pixels, which is determined to be of a noise(s) based on threshold values set according to shape characteristics such as the size, the area, the ratio between the width and the length, etc., is removed from the primary selection pixels.

An inspection result image P1 is thus obtained.

The respective steps will now be described in more detail.

(Setting of Scanning Direction)

The "scanning direction" described in the step S1 in FIG. 1 refers to a direction in which an image is scanned by the below-described "valley method" in the evaluation step, e.g. the direction of arrow A1 in FIGS. 3 through 6.

Figure 2:
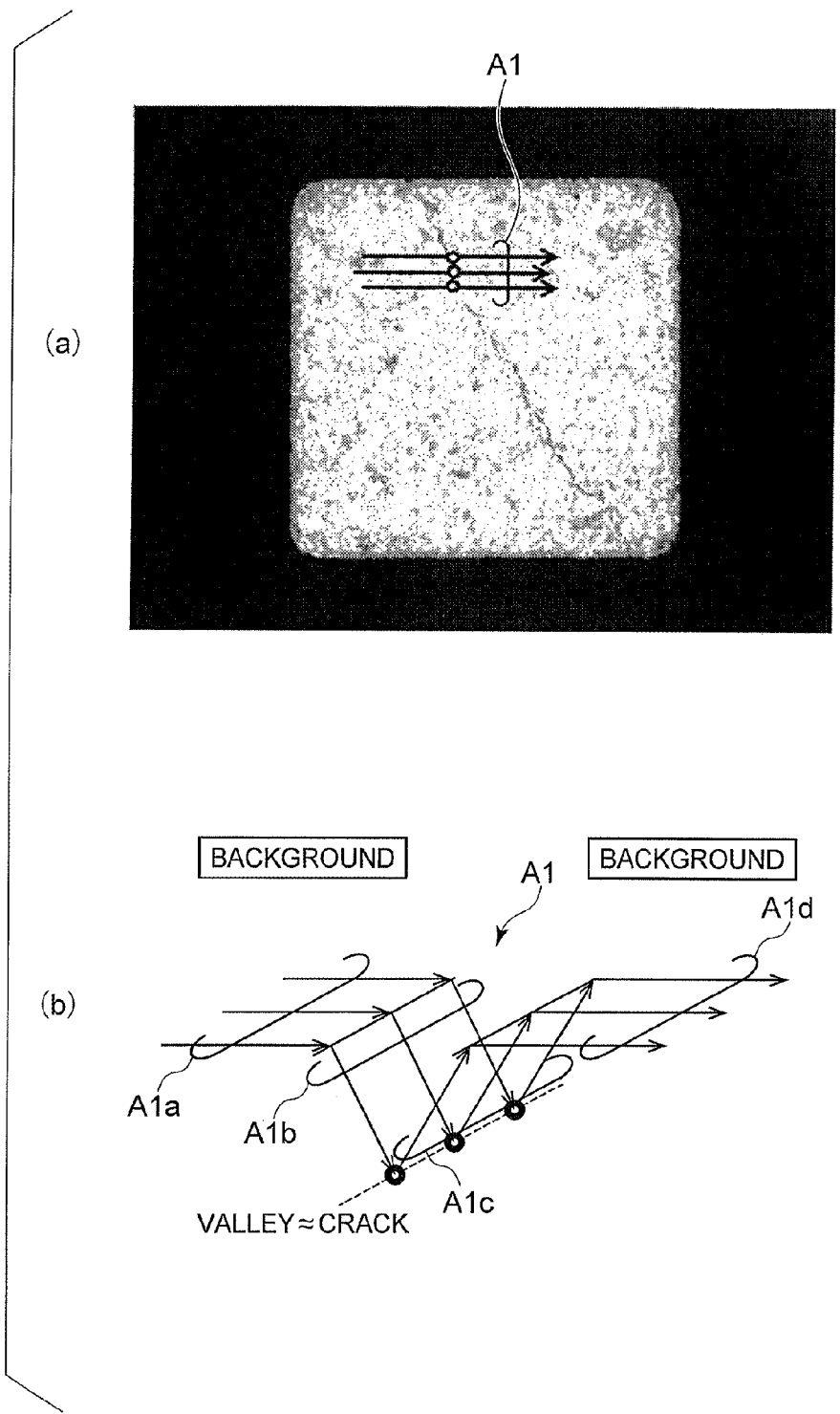
FIG. 2(a) is a diagram showing a scanning direction in an evaluation step.
FIG. 2(b) is a diagram showing a crack and a scanning direction.
Figure 3:
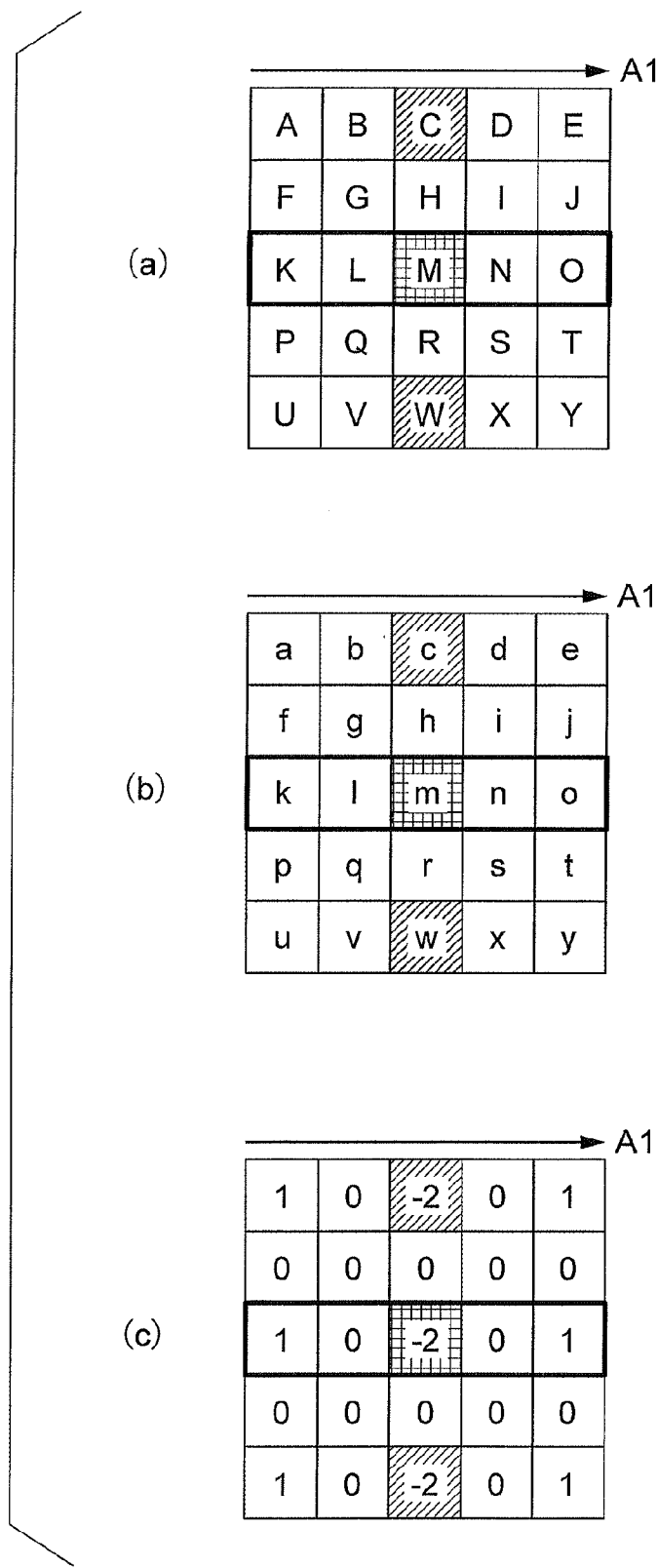
FIG. 3(a) is a diagram showing an array of pixels.
FIG. 3(b) is a diagram showing the luminances of the pixels.
FIG. 3(c) is a diagram showing an exemplary scanning filter.
Figure 4:
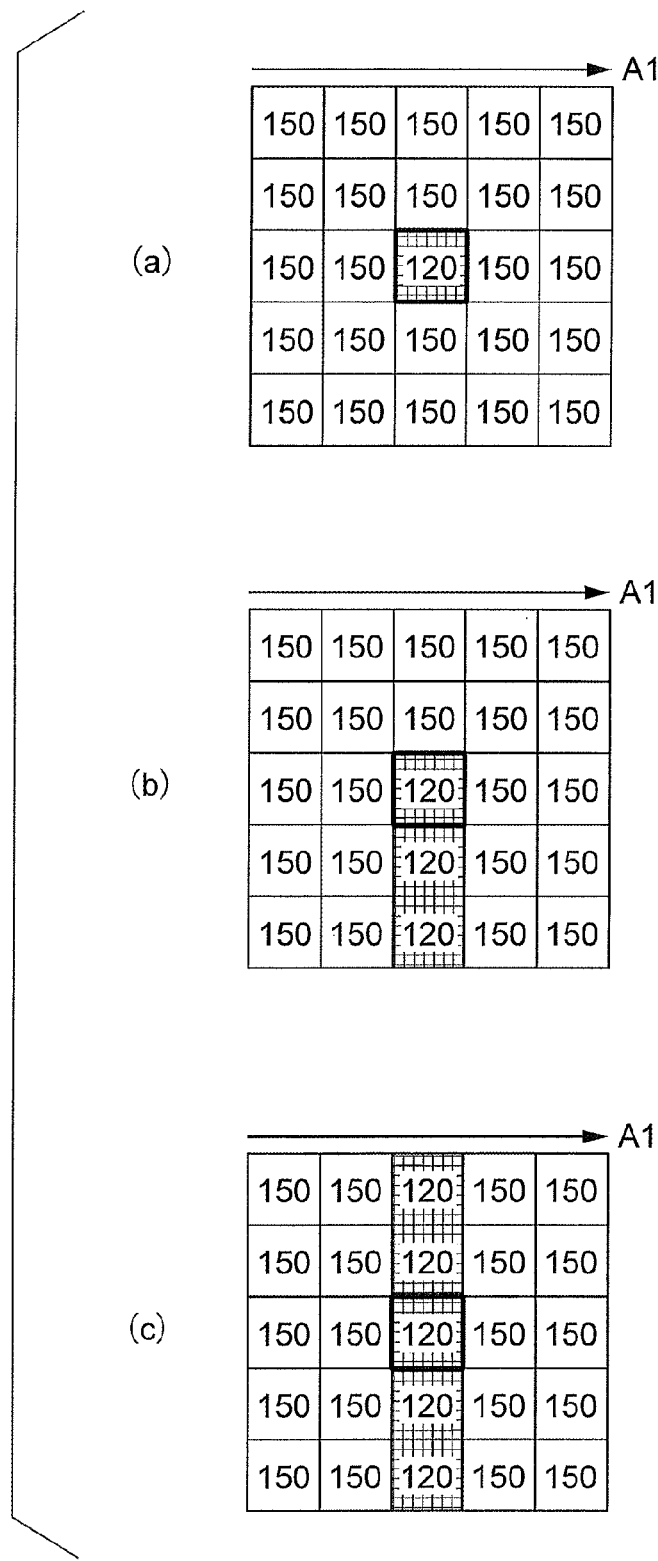
FIGS. 4(a) through 4(c) are diagrams showing exemplary processing object images in which the respective attention pixels have a positive evaluation value.
Figure 5:
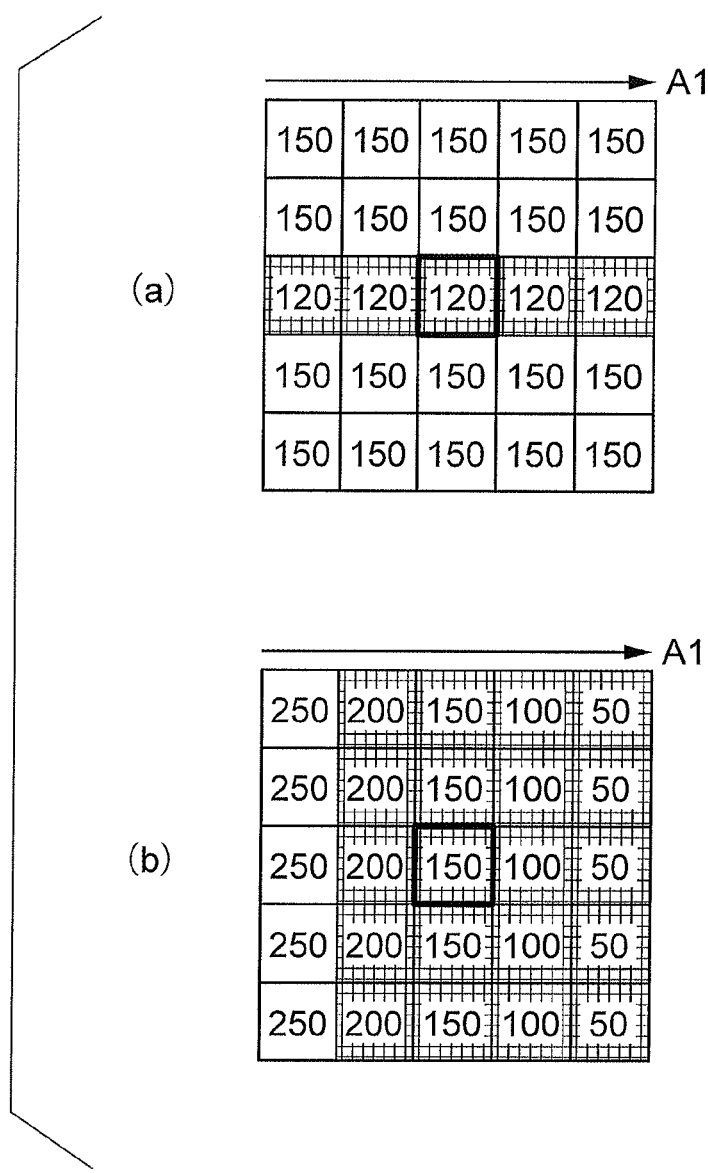
FIGS. 5(a) and 5(b) are diagrams showing exemplary processing object images in which the respective attention pixels have an evaluation value of 0.
Figure 6:
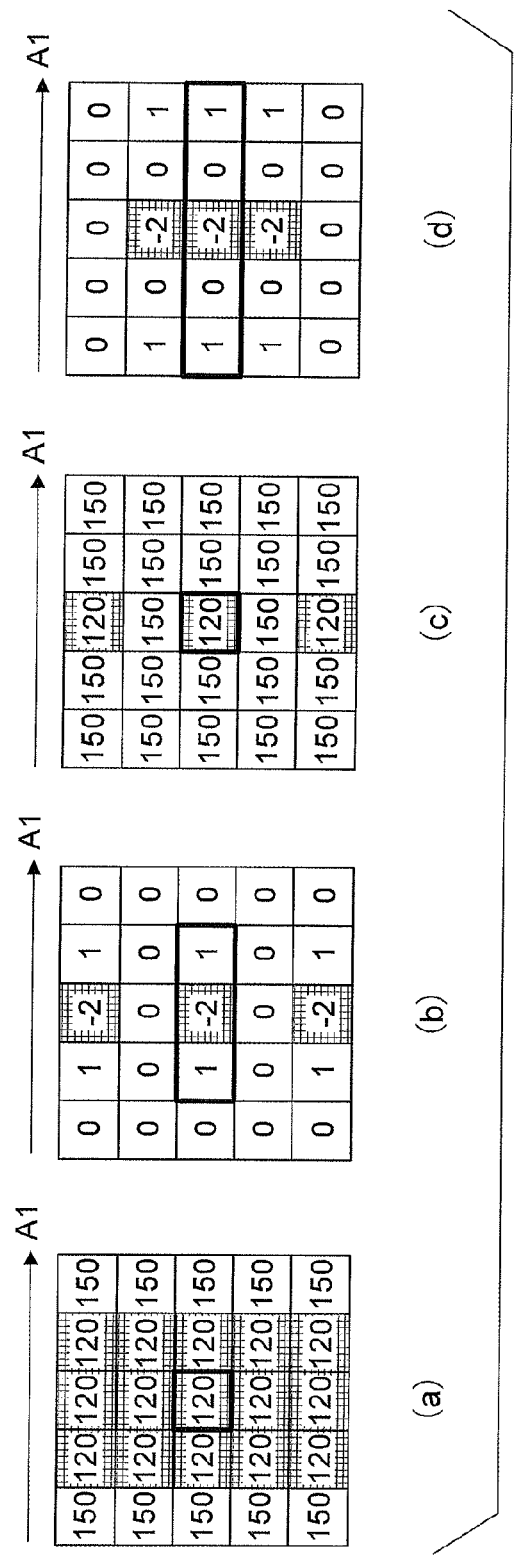
FIGS. 6(a) through 6(d) are diagrams illustrating the meaning of the reference positions of adjacent pixels.
Figure 7:
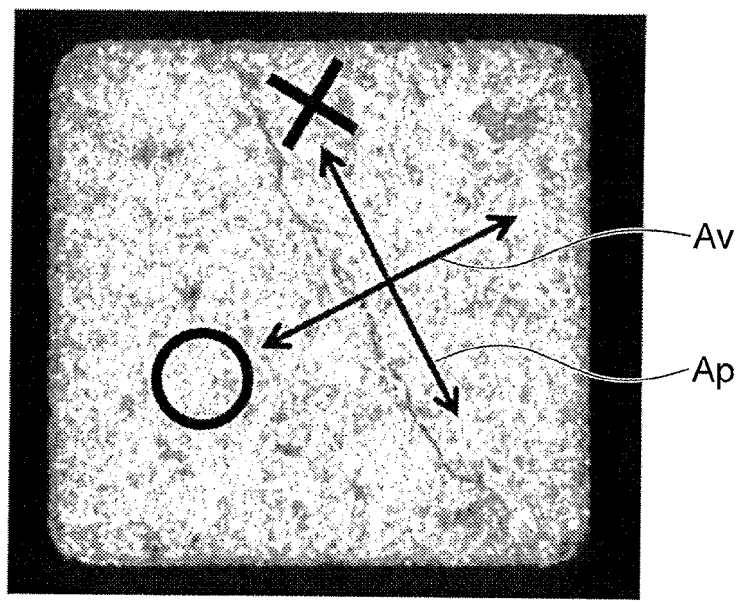
FIG. 7 is a diagram showing the relationship between the direction of a crack and the scanning direction.
Figure 8:
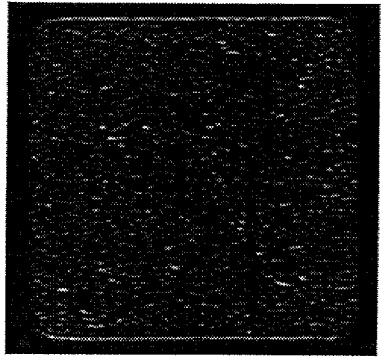
FIGS. 8(a) through 8(d) are diagrams showing the results of evaluation for various scanning directions.
Figure 8:
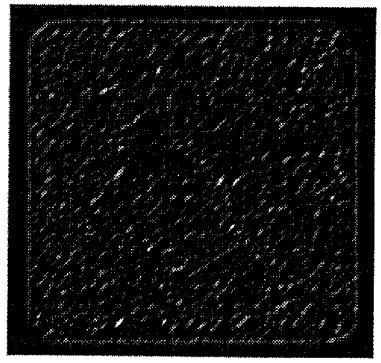
Figure 8:
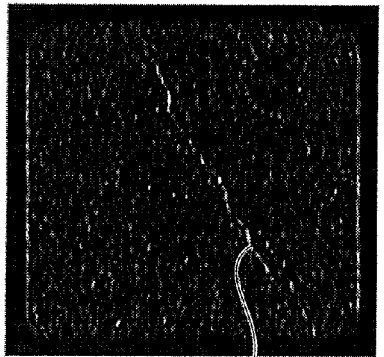
Figure 8:
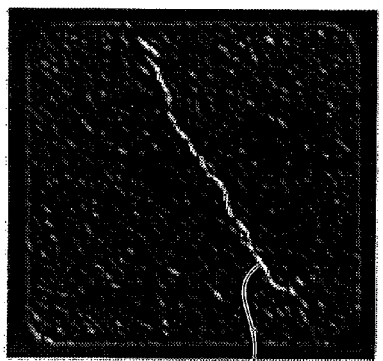
Figure 9:
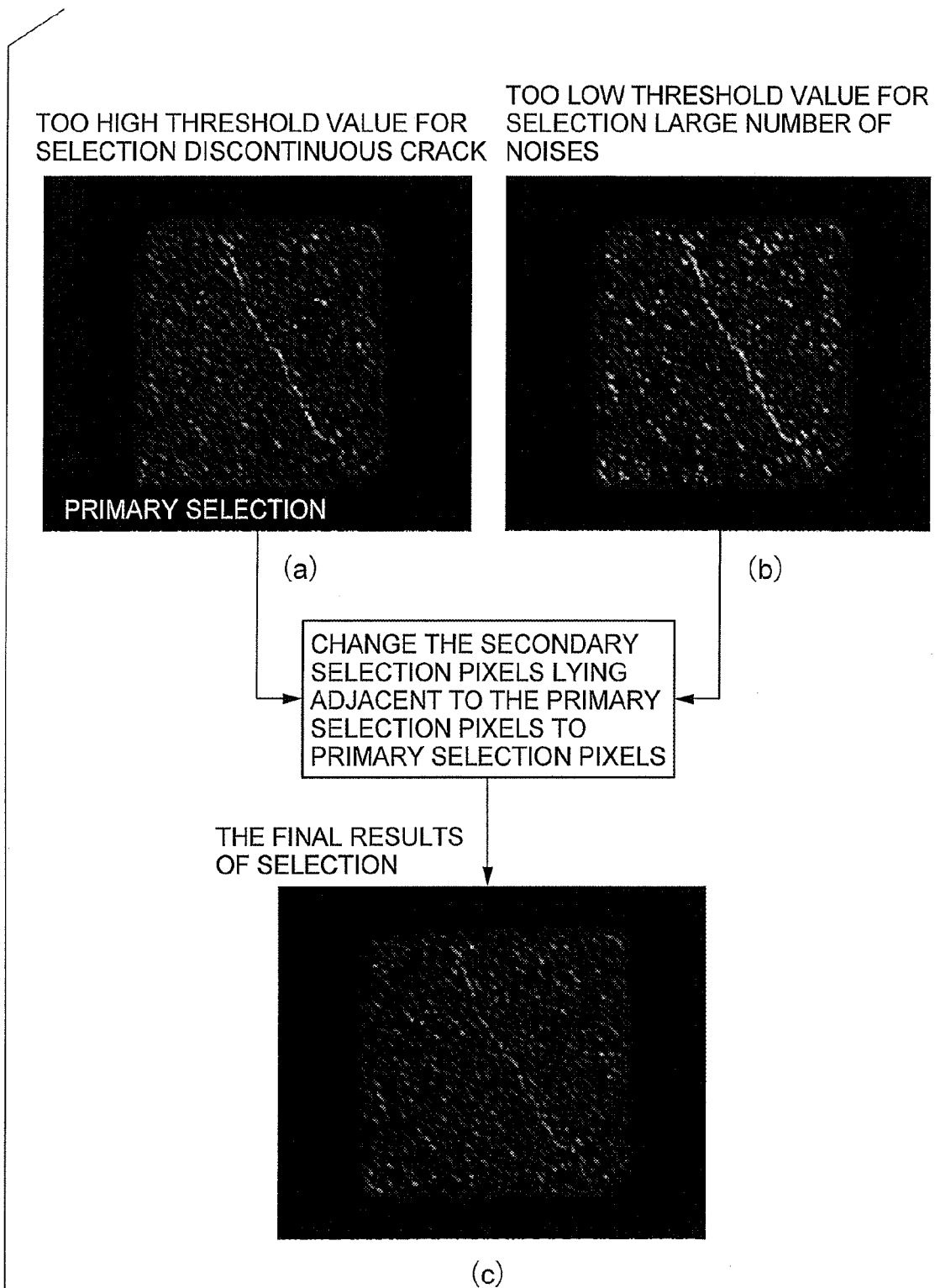
FIGS. 9(a) through 9(c) are diagrams illustrating a selection step.
Figure 10:
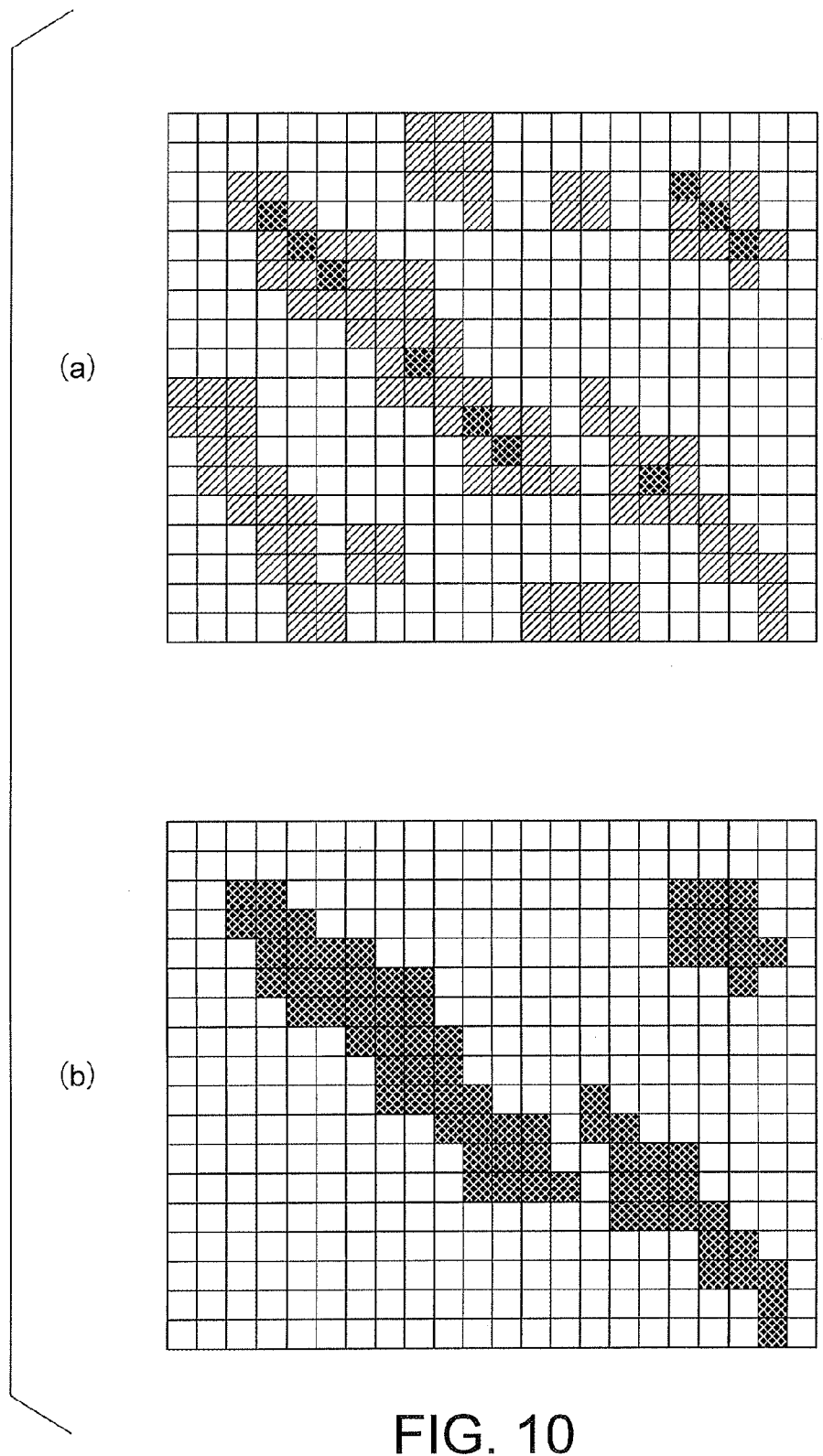
FIGS. 10(a) and 10(b) are diagrams illustrating an exemplary case in which secondary selection pixels are changed to primary selection pixels.
Figure 11:
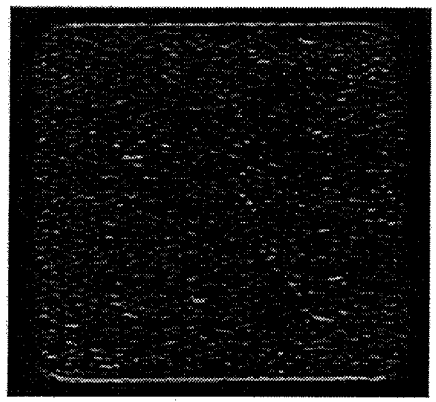
FIGS. 11(a) through 11(d) are diagrams showing the results of selection for the scanning directions.
Figure 11:
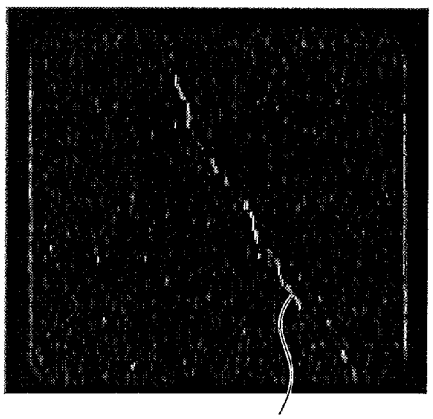
Figure 11:
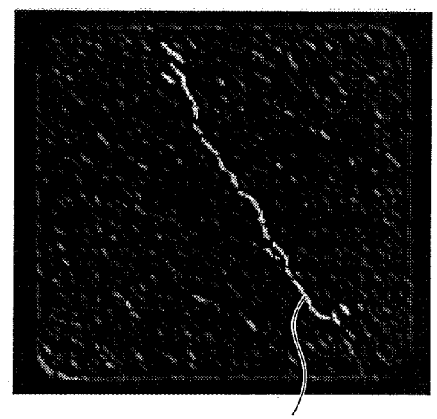

As shown in FIGS. 2 and 7, evaluation is made to detect pixels in particular positional relationship in a direction perpendicular to each scanning direction. When the scanning direction is set at 0-degree direction, 45-degree direction, 90-degree direction and 135-degree direction, crack components of 0-degree direction, 45-degree direction, 90-degree direction and 135-degree direction are detected.

(Evaluation Step)

As shown in FIGS. 2(a) and 2(b), the "valley method" is used in the evaluation step of the defect inspection method according to the present invention. FIG. 2(a) illustrates scanning of a crack C2 (see FIG. 21(b)) in the direction of arrow A1. Referring to FIG. 2(b), the arrow A1, indicating the scanning direction, consists of four arrows: arrow A1a, arrow A1b, arrow A1c and arrow A1d. The luminance of the input image changes as follows along the scanning direction A1 starting from the arrow A1a: The luminance is high in the background area, and the luminance decreases in a valley which is expected to be a crack and reaches the lowest value at the bottom of the valley. The luminance then increases and reaches a high value in the background area. The "valley method" is a method to extract pixels having a high "likelihood of crack" by utilizing the following two features of crack-related pixels:

The first feature resides in that when scanning is performed in a direction perpendicular to a crack, a crack-related pixel has a minimum luminance value as compared to adjacent pixels (first adjacent pixels) located on both sides of the pixel in the scanning direction.

The second feature resides in that second adjacent pixels, located on both sides of the crack-related pixel in a direction perpendicular to the scanning direction, each have a minimum luminance value as compared to adjacent pixels (third adjacent pixels) located on both sides of the second adjacent pixel in the scanning direction.

The above description applies to a crack that appears dark (black) on a bright (white) background. In the case of a crack that appears bright (white) on a dark (black) background, a crack-related pixel has a maximum, not a minimum, luminance value.

An example of an evaluation made by the "valley method" will now be described with reference to FIGS. 3(a) through 3(c), FIGS. 4(a) through 4(c), FIGS. 5(a) and 5(b), and FIGS. 6(a) through 6(d).

As described above, in this embodiment scanning of a shot image is performed in the four directions, i.e. 0-degree direction, 45-degree direction, 90-degree direction and 135-degree direction, using a dedicated scanning filter for each direction.

Consider the case of scanning a shot image using a 0-degree direction scanning filter. FIG. 3(a) shows capital alphabetical characters assigned to a 5×5 array of pixels, and FIG. 3(b) shows small alphabetical characters, corresponding to the capital alphabetical characters of the pixels and representing the luminances of the pixels. FIG. 3(c) shows an exemplary 0-degree direction scanning filter usable for making an evaluation of the pixels of FIG. 3(a) by the "valley method".

In FIGS. 3(a) through 3(c), reference is made to adjacent pixels each at a two-pixel distance from an attention pixel, pixel M. The pixels K, O, located on both sides of and adjacent to the pixel M (at a distance of two pixels) in the scanning direction A1, are first adjacent pixels. The pixels C, W, located on both sides of and adjacent to the attention pixel M (at a distance of two pixels) in a direction perpendicular to the scanning direction A1, are second adjacent pixels. The pixels A, E and the pixels U, Y, located on both sides of and adjacent to the second adjacent pixels C, W (at a distance of two pixels), respectively, in the scanning direction A1, are third adjacent pixels. Referring to FIGS. 3(a) through 3(c), scanning is assumed to be performed in the direction of arrow A1.

Referring to FIGS. 3(a) through 3(c), the attention pixel (evaluation object pixel) M is a pixel located at the center of the 5×5 array of pixels. In the evaluation made by using e.g. the 0-degree direction scanning filter, an evaluation value can be determined by the following calculation: Evaluation value for the attention pixel=$(a+k+u+e+o+y)-2\times(c+m+w)$ where a, k, u, e, o, y, c, m, w represent the luminance values of the corresponding pixels A, K, U, E, O, Y, C, M, W.

FIGS. 4(a) through 4(c) show exemplary processing object images for which a positive evaluation value is to be calculated. Scanning is assumed to be performed in the direction of arrow A1. FIG. 4(a) shows an image of an isolated spike noise, in which the attention pixel M has an evaluation value of 60. FIG. 4(b) shows an image of an end portion of a crack, in which the attention pixel M has an evaluation value of 120. FIG. 4(c) shows an image of a middle portion of a crack, in which the attention pixel M has An evaluation value of 180. The spike noise of FIG. 4(a) is determined to have a low likelihood of crack as compared to the crack end portion of FIG. 4(b) and the crack middle portion of FIG. 4(c).

FIGS. 5(a) and 5(b) show exemplary processing object images in which the evaluation value of the attention pixel M is calculated to be 0. FIG. 5(a) shows an image of a crack parallel to the scanning direction A1.

FIG. 5(b) shows an image of an area in which the luminance decreases with a constant gradient along the scanning direction A1. The attention pixel M has an evaluation value of 0. Such a luminance gradient is often found as a normal background pattern which may be produced e.g. by the inclination of the inspection object surface. Because of the large change in the luminance value, such a normal background area can be falsely detected as a crack in the inspection of cracks performed in a conventional manner.

FIG. 4(c) shows a crack perpendicular to the scanning direction, and FIG. 5(a) shows a crack parallel to the scanning direction. As will be appreciated from comparison between FIG. 4(c) and FIG. 5(a), the evaluation value of the attention pixel M varies depending on the scanning direction.

By setting a scanning direction perpendicular to the direction of a crack, a crack component can be appropriately evaluated and extracted (FIG. 7).

The meaning of the reference positions of adjacent pixels will now be described with reference to FIGS. 6(a) through 6(d).

The width of a crack to be detected can be changed by changing the reference positions of the first adjacent pixels and the third adjacent pixels.

FIG. 6(a) is a diagram showing a crack having a width of three pixels and extending in the 90-degree direction. The above-described crack shown in FIG. 4(c) has a width of one pixel and extends in the 90-degree direction.

For example, when an evaluation is made using a 0-degree direction scanning filter which refers to the first adjacent pixels and the third adjacent pixels at a distance of one pixel from the attention pixel M and the second adjacent pixels, respectively, as shown in FIG. 6(b), the attention pixel M of FIG. 6(a) has an evaluation value of 0, and the attention pixel M of FIG. 4(c) has an evaluation value of 180. Thus, while the crack having a width of one pixel can be detected, the crack having a width of three pixels cannot be detected.

On the other hand, when an evaluation is made using a 0-degree direction scanning filter which refers to the first adjacent pixels and the third adjacent pixels at a distance of two pixels from the attention pixel M and the second adjacent pixels, respectively, as shown in FIG. 3(c), the attention pixel M of FIG. 6(a) has an evaluation value of 180, and the attention pixel M of FIG. 4(c) also has an evaluation value of 180. Thus, both the crack having a width of one pixel and the crack having a width of three pixels can be detected.

The reference positions of the first adjacent pixels and the third adjacent pixels may be changed in this manner depending on the width of a crack to be detected.

By narrowing down the detection object to a crack having a width of not more than a certain width, the freedom of the amount of shape characteristics that can be used for noise removal in the later correction step can be increased. This can enhance the accuracy of detection.

Overlooking of crack-related pixels which are likely to be falsely determined to be spike noise-related pixels can be prevented by changing the reference positions of the second adjacent pixels.

All the pixels of a crack do not always constitute a continuous line as shown in FIG. 4(c): In some cases, some crack-related pixels constitute a discontinuous dotted line as shown in FIG. 6(c).

When the image of FIG. 6(c) is viewed locally (e.g. the central 3×3 pixels), the attention pixel M of FIG. 6(c) is indistinguishable from that of a spike noise as shown in FIG. 4(a).

For example, when an evaluation is made using a scanning filter which refers to the second adjacent pixels at a distance of one pixel from the attention pixel M, as shown in FIG. 6(d), the attention pixel M of FIG. 4(c) has an evaluation value of 180, and the attention pixel M of FIG. 6(c) has an evaluation value of 60 which is equal to the evaluation value of a spike noise pixel as shown in FIG. 4(a). Accordingly, the crack-related pixel of FIG. 6(c) will be overlooked in the selection step.

On the other hand, when an evaluation is made using a scanning filter which refers to the second adjacent pixels at a distance of two pixels from the attention pixel M, as shown in FIG. 3(c), the attention pixel M of FIG. 6(c) has an evaluation value of 180 which is equal to the evaluation value of the attention pixel M of FIG. 4(c). Thus, the pixel M of FIG. 6(c) can be extracted as a pixel which, though discontinuous, has a high "likelihood of crack" (as a pixel which can be processed into a crack-related pixel in the later connection step).

A crack-related pixel which is indistinguishable from a spike noise-related pixel in a local view can be prevented from being overlooked by thus changing the reference positions of the second adjacent pixels.

Figure 21:
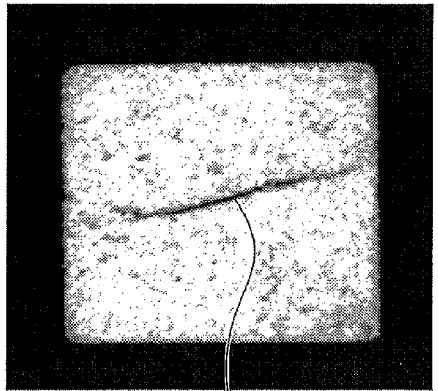
FIGS. 21(a) and 21(b) are diagrams each showing an image of an exemplary crack.
Figure 21:
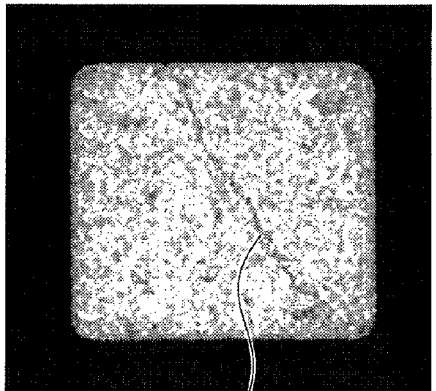
Figure 22:
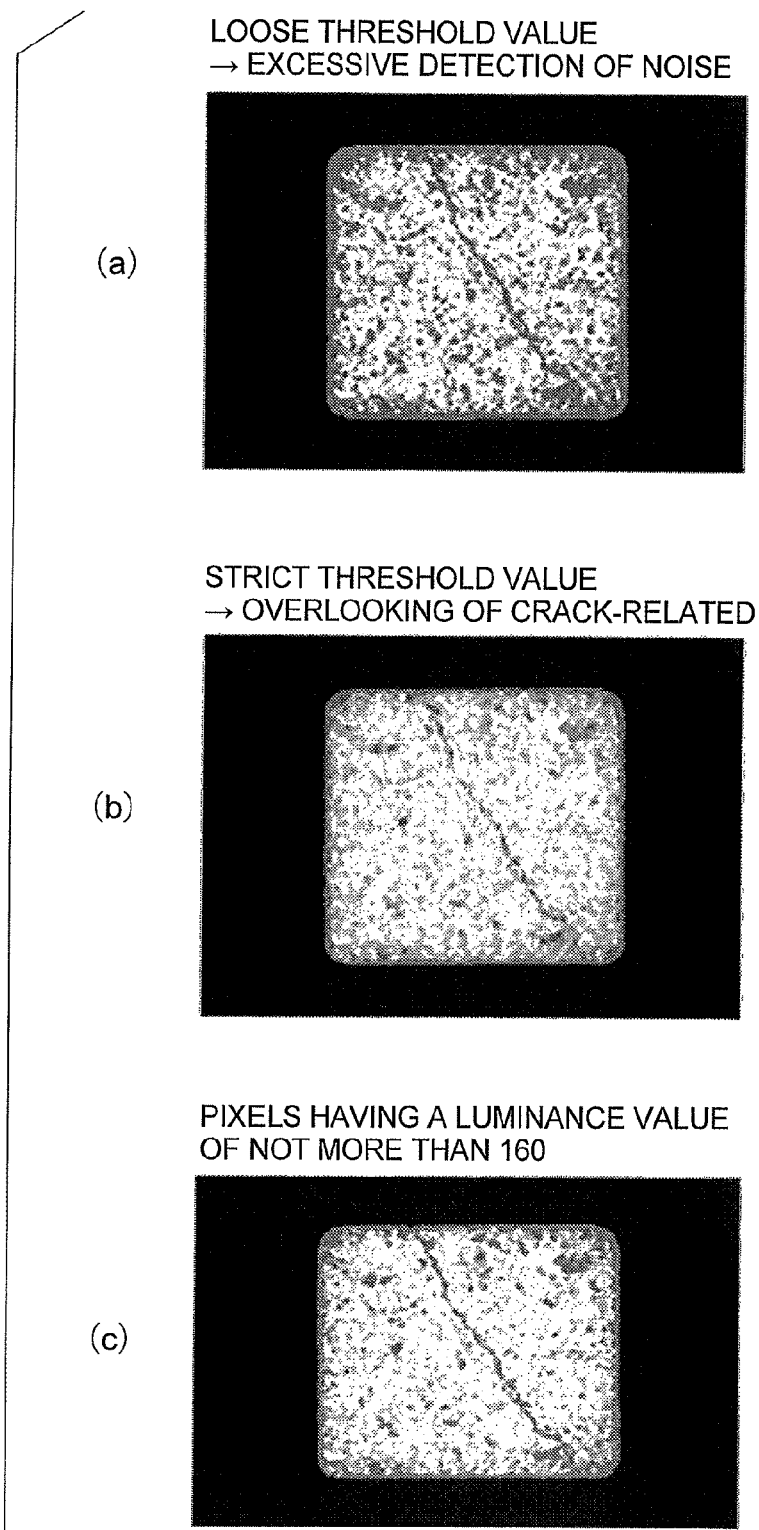
FIGS. 22(a) through 22(c) are diagrams illustrating problems in the conventional defect inspection method.

FIG. 7 shows the relationship between the direction of a crack (e.g. the crack C2 of FIG. 21(b)) and the scanning direction. As shown in FIG. 7, pixels having a high "likelihood of crack" can be extracted when an object image is scanned by using a filter for scanning in the direction Av which is perpendicular to the direction of the crack, whereas pixels having a high "likelihood of crack" cannot be extracted when the object image is scanned by using a filter for scanning in the direction Ap which is parallel to the direction of the crack.

A direction in which an actual crack is formed is in many cases not known. Accordingly, it is generally difficult to predetermine a scanning direction perpendicular to the direction of a crack, such as the scanning direction Av of FIG. 7. Therefore, as described above, the four scanning directions, i.e. 0-degree direction, 45-degree direction, 90-degree direction and 135-degree direction, are set in the "valley method" of this embodiment, and scanning of a shot image is performed in each direction.

FIGS. 8(a) through 8(d) show evaluation result images for the respective scanning directions after completion of the evaluation step performed on an image of the crack C2 shown in FIG. 21(b) as an "input image" in the flow chart of FIG. 1. The largest number of pixels having a high "likelihood of crack" have been extracted in the image of FIG. 21(b) which shows the results for the 135-degree direction component (obtained by the use of a 45-degree direction scanning filter) which is near the direction of the crack C2 shown in FIG. 21(b).

(Selection Step)

The selection step will now be described. FIGS. 9(a) through 9(c) show a block diagram of the entire selection step using images.

Figure 23:
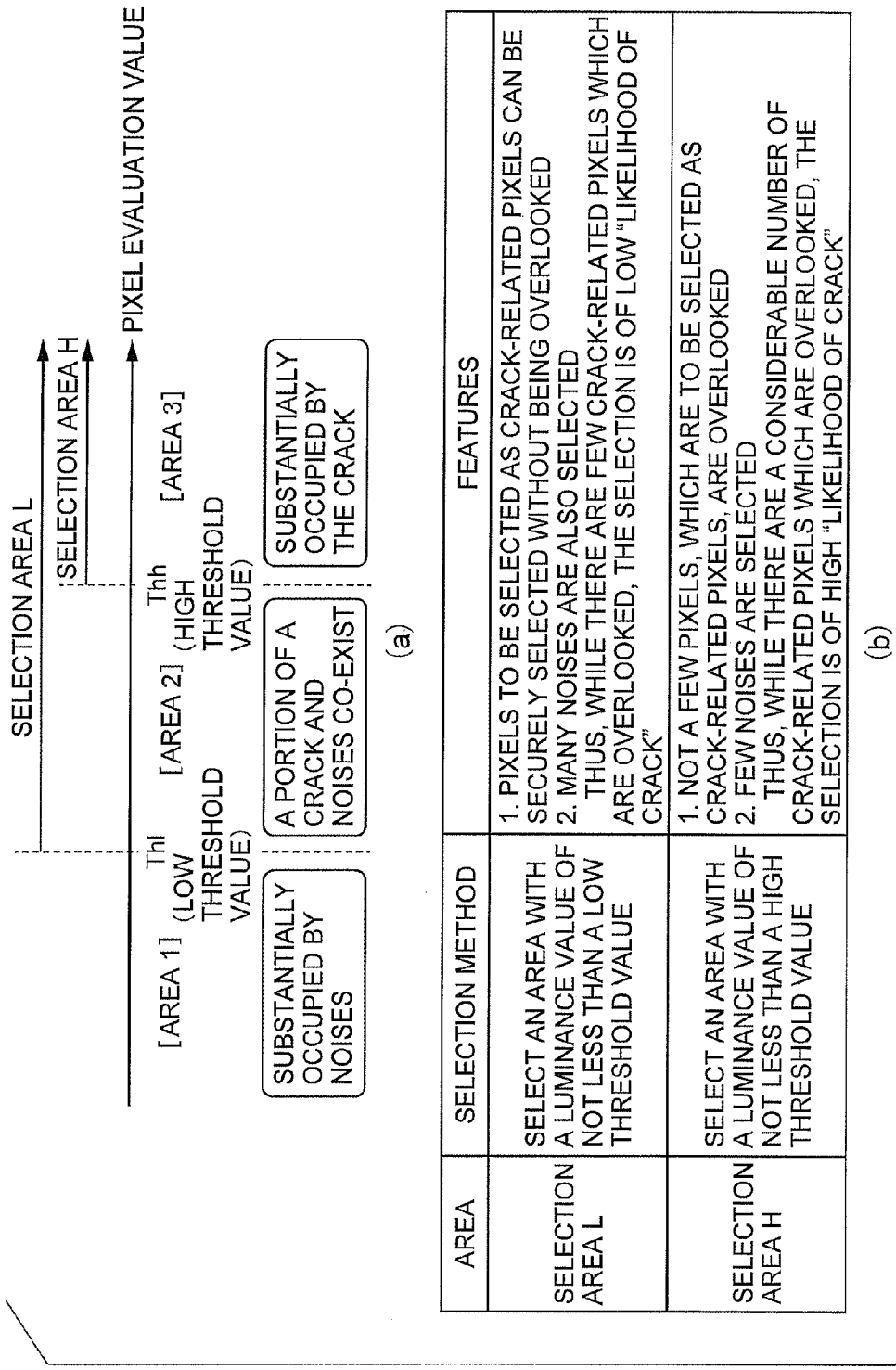
FIGS. 23(a) and 23(b) are diagrams illustrating problems with the conventional defect inspection method.
Figure 24:
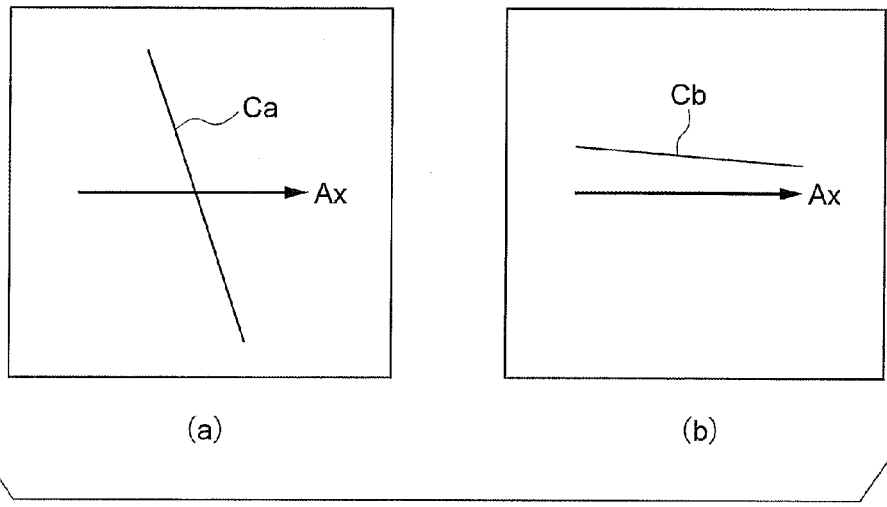
FIGS. 24(a) and 24(b) are diagrams showing the relationship between the direction of a crack and the scanning direction.

As described above with reference to FIGS. 22(a) and 22(b) and FIGS. 23(a) and 23(b), if a loose threshold value (the low threshold value Thl of FIG. 23(a)) is used in the selection step, noises other than a crack will be selected. If a strict threshold value (the high threshold value Thh of FIG. 23(a)) is used in the selection step, not a few crack-related pixels will be overlooked.

In the selection step of this embodiment, primary selection pixels are first determined (selected) based on the evaluation value of each pixel and using a strict threshold value (first threshold value which is a high threshold value) for each of the four scanning directions, i.e. 0-degree direction, 45-degree direction, 90-degree direction and 135-degree direction (FIG. 9(a)). Next, secondary selection pixels are determined (selected) based on the evaluation value of each pixel and using a loose threshold value (second threshold value which is lower than the high threshold value) (FIG. 9(b)). Next, of the secondary selection pixels, those secondary selection pixels which lie adjacent to the primary selection pixels and those secondary selection pixels which lie adjacent to the adjacent secondary selection pixels are changed to primary selection pixels. The final selection results are obtained after performing such multistage selection (FIG. 9(c)).

FIGS. 10(a) and 10(b) illustrate an exemplary case in which "those secondary selection pixels which lie adjacent to the primary selection pixels and those secondary selection pixels which lie adjacent to the adjacent secondary selection pixels are changed to primary selection pixels". In FIG. 10(a), pixels with dark hatching represent the initial primary selection pixels, and pixels with light hatching represent the initial secondary selection pixels.

Those secondary selection pixels which meet the requirement "those secondary selection pixels which lie adjacent to the primary selection pixels and those secondary selection pixels which lie adjacent to the adjacent secondary selection pixels" are selected from the initial secondary selection pixels and changed to primary selection pixels. This operation increases the number of primary selection pixels with dark hatching, as shown in FIG. 10(b). The multistage selection method has the following advantages: The selection with the strict first threshold value can prevent selection of noises. Furthermore, some crack-related pixels, which have been overlooked in the selection with the strict first threshold value, can be picked up under the particular conditions from those pixels which have been selected with the loose second threshold value. Thus, the multistage selection method can prevent false selection of noises and, in addition, can prevent overlooking of crack-related pixels. The results of the multistage selection (results of the selection step) performed for each of the four directional components, i.e. 0-degree direction component, 45-degree direction component, 90-degree direction component and 135-degree direction component, are shown in FIGS. 11(a) through 11(d).

(Connection Step)

The connection step will now be described with reference to FIGS. 12 through 16. In particular, the following basic image processing operations in the connection step will be described: expansion processing, contraction processing, opening processing and closing processing.

Figure 25:
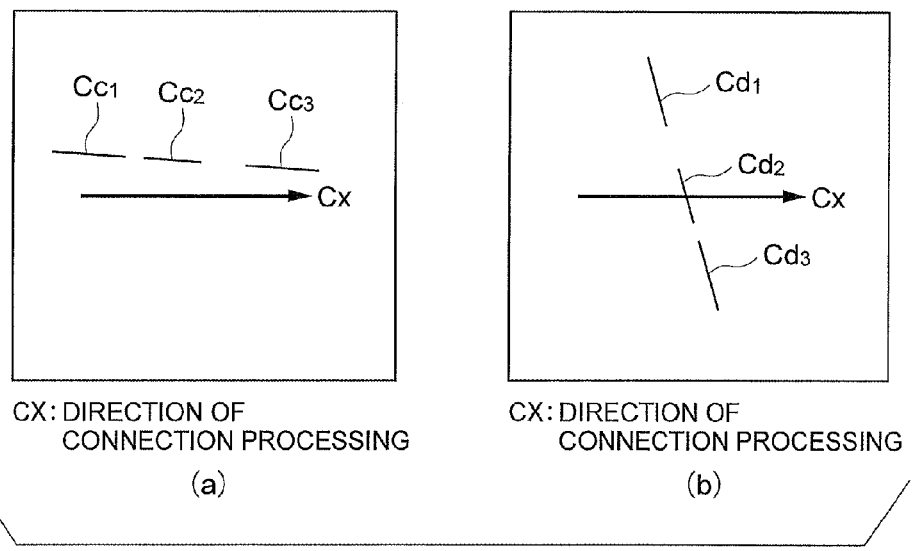
FIGS. 25(a) and 25(b) are diagrams illustrating a problem with a connection step in the conventional defect inspection method.

In this embodiment, connection processing can be performed only in a direction parallel to each crack component of 0-degree direction, 45-degree direction, 90-degree direction or 135-degree direction. This can solve the problems in the prior art described above with reference to FIGS. 25(a) and 25(b), which are due to no knowledge of a direction in which a crack is formed, in particular the problems of overlooking of a crack and false detection of noises caused by connection processing performed in a direction perpendicular to a crack.

Figure 12:
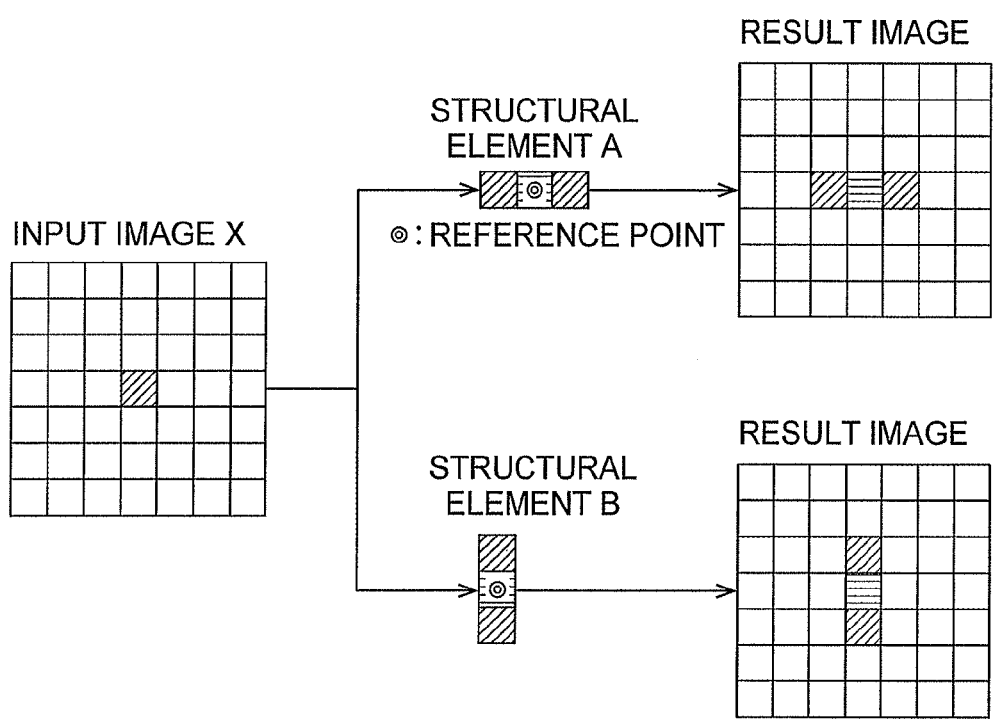
FIG. 12 is a diagram illustrating expansion processing in a connection step.

FIG. 12 illustrates an example of expansion processing of a connection object pixel.

As shown in FIG. 12, expansion processing of an input image X is performed by applying a linear structural element A or B to the image X, thereby obtaining a result image. The reference point of the structural element A or B is put on the input image X.

Figure 13:
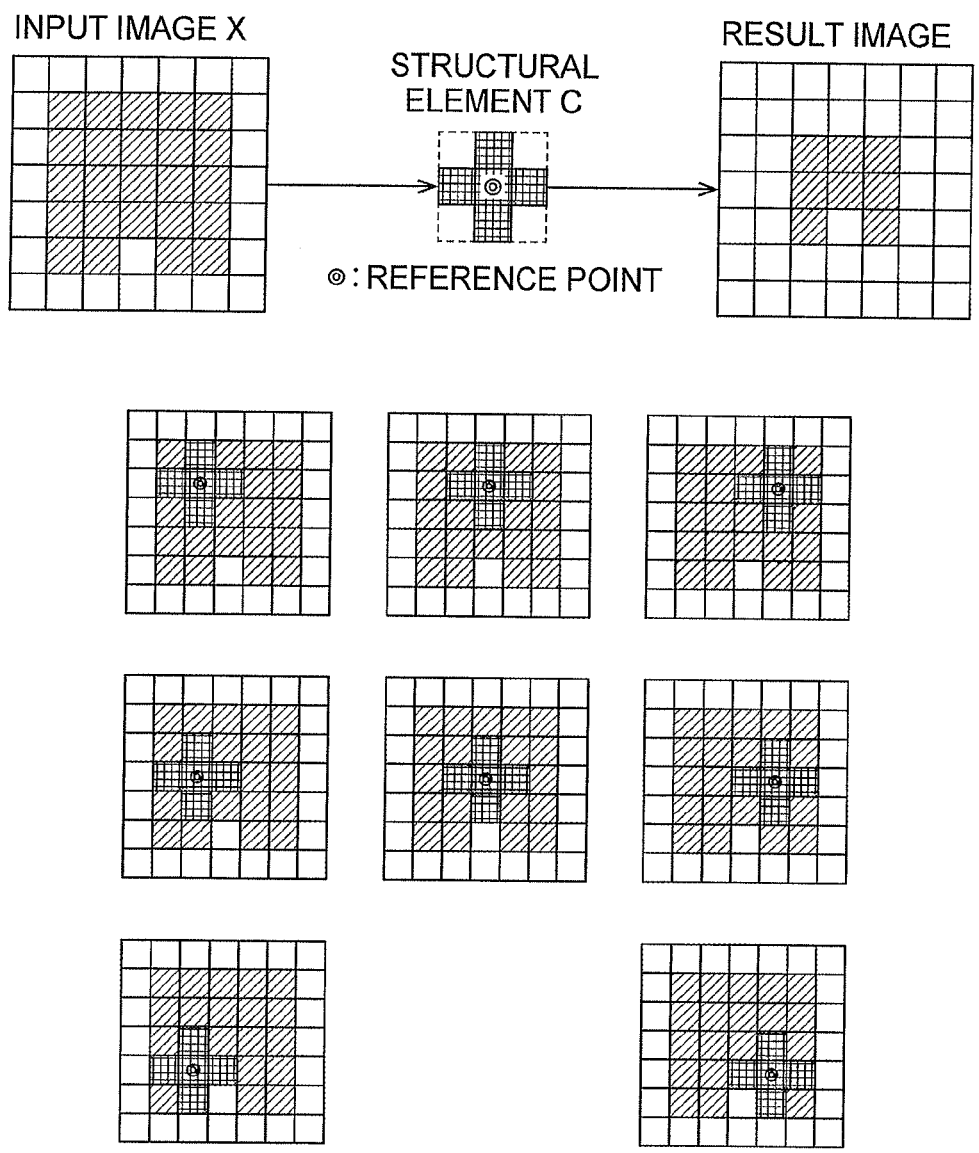
FIG. 13 is a diagram illustrating contraction processing in the connection step.

FIG. 13 illustrates an example of contraction processing of connection object pixels.

As shown in FIG. 13, contraction processing of an input image X is performed by applying a cross-shaped structural element C to the image X, thereby obtaining an result image. The reference point of the structural element C is put on the input image X.

Figure 14:
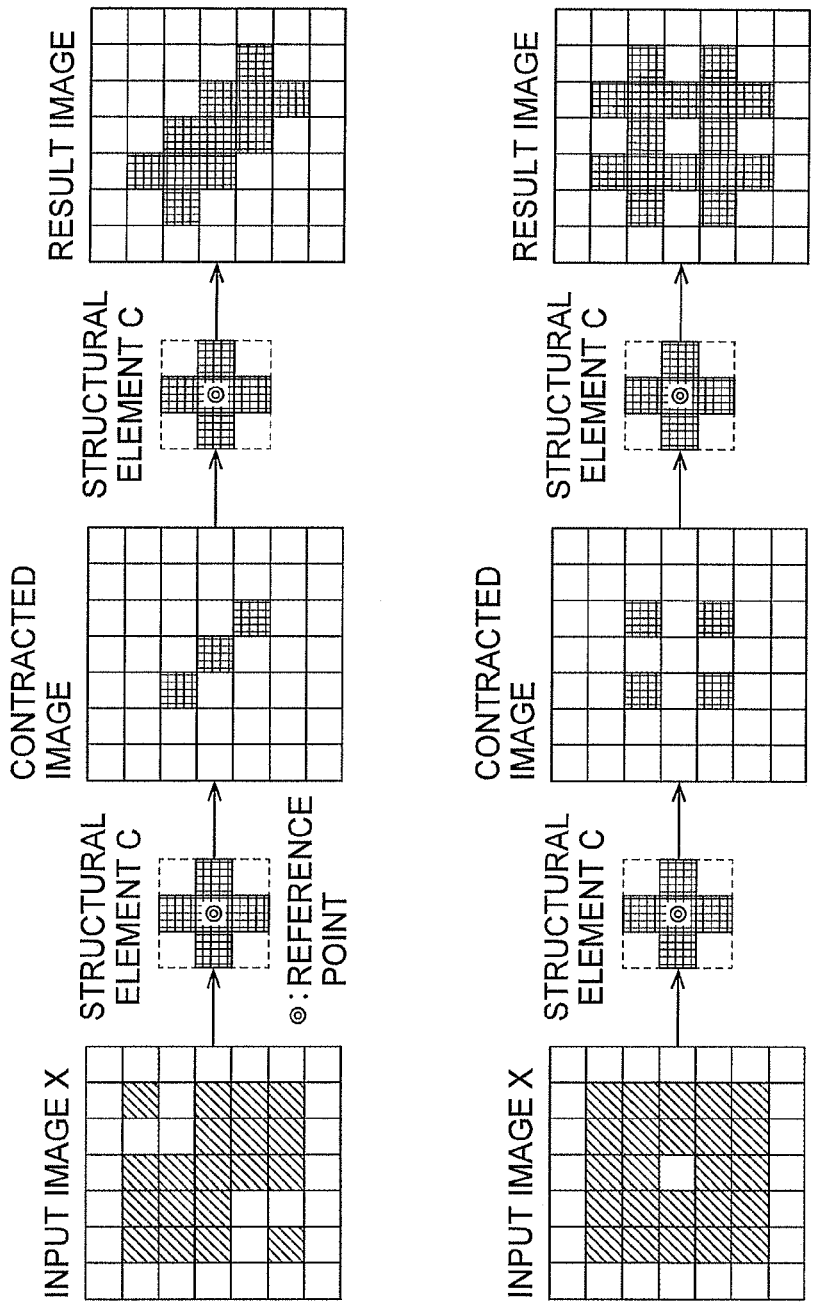
FIG. 14 is a diagram illustrating opening processing in the connection step.

FIG. 14 illustrates examples of opening processing of connection object pixels. The opening processing refers to a process comprising contraction processing of an input image performed e.g. one time, and subsequent expansion processing performed the same number of times (e.g. one time) as the contraction processing.

Opening processing of an input image X is performed with the use of a cross-shaped structural element C having a reference point, thereby obtaining a result image.

Figure 15:
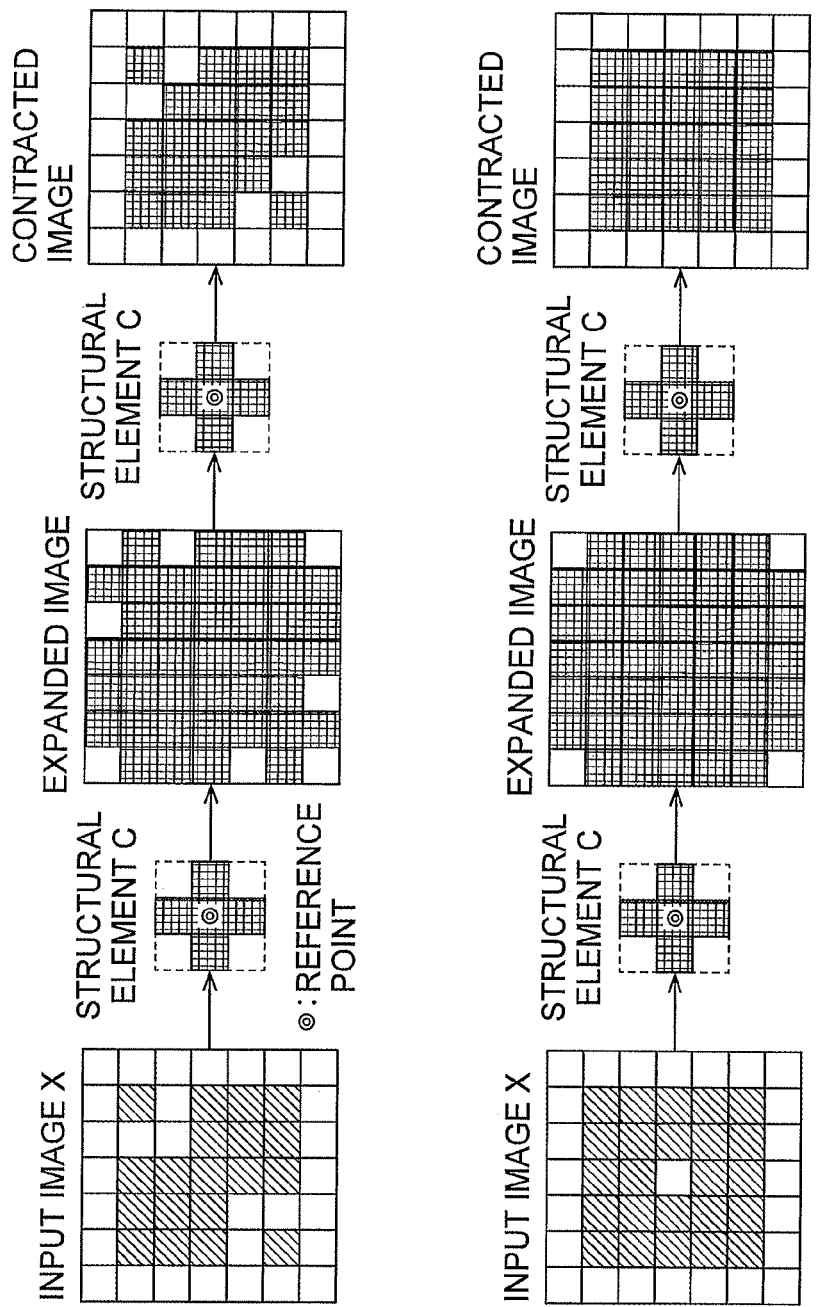
FIG. 15 is a diagram illustrating closing processing in the connection step.

FIG. 15 illustrates examples of closing processing of an input image X. The closing processing refers to a process comprising expansion processing of an input image performed e.g. one time, and subsequent contraction processing performed the same number of times (e.g. one time) as the expansion processing.

Closing processing of the input image X is performed with the use of a cross-shaped structural element C having a reference point, thereby obtaining a result image.

Figure 16:
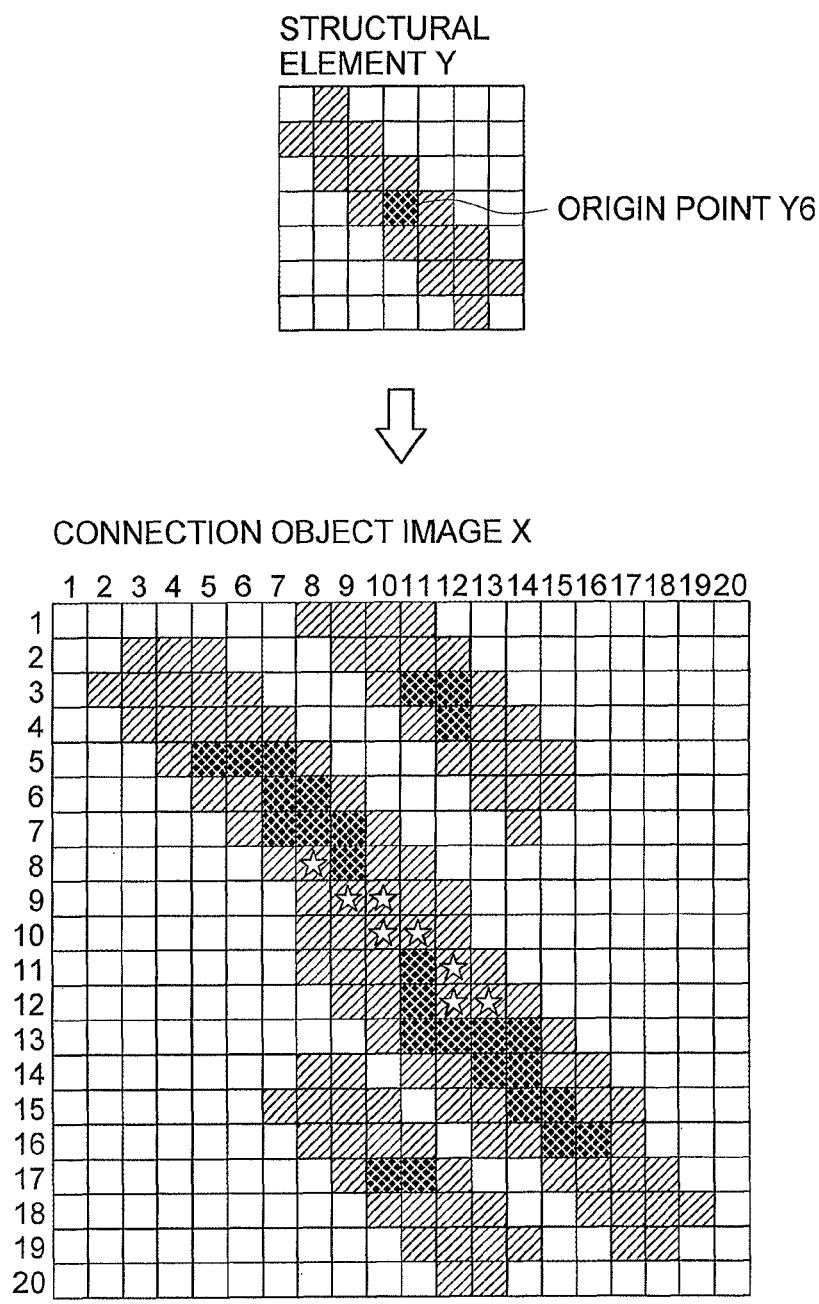
FIG. 16 is a diagram illustrating connection processing (closing processing) performed for the 135-degree direction in the connection step.
Figure 17:
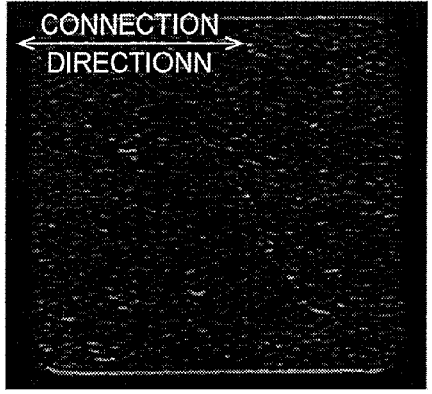
FIGS. 17(a) through 17(d) are diagrams showing, together with connection processing directions, the results of a selection step for the scanning directions.
Figure 17:
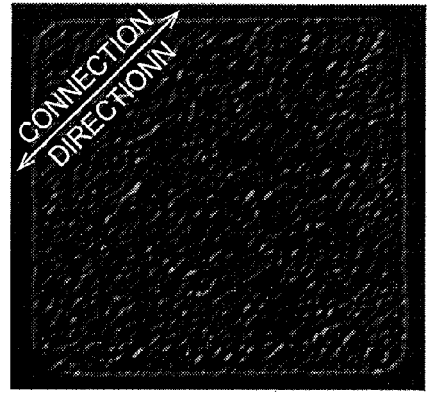
Figure 17:
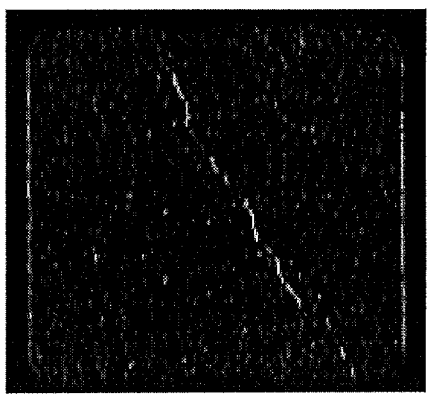
Figure 17:
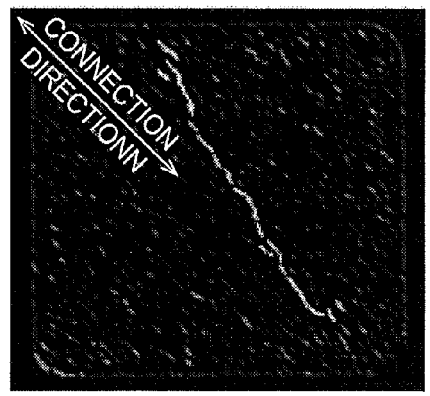
Figure 18:
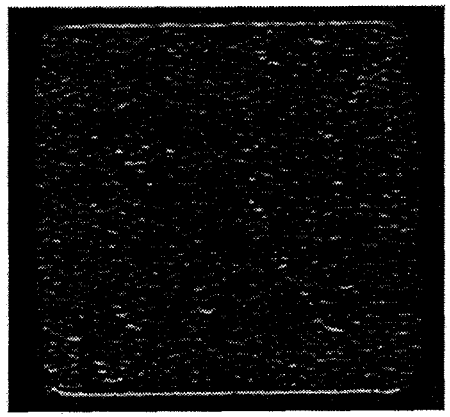
FIGS. 18(a) through 18(d) are diagrams showing the results of a connection step for the scanning directions.
Figure 18:
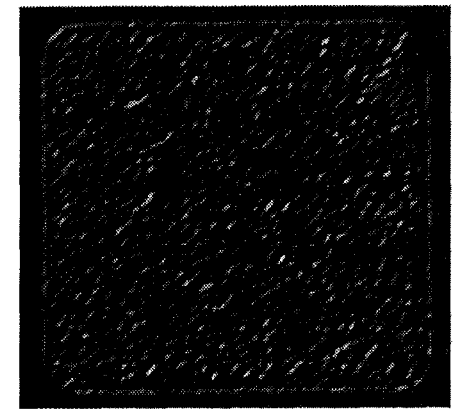
Figure 18:
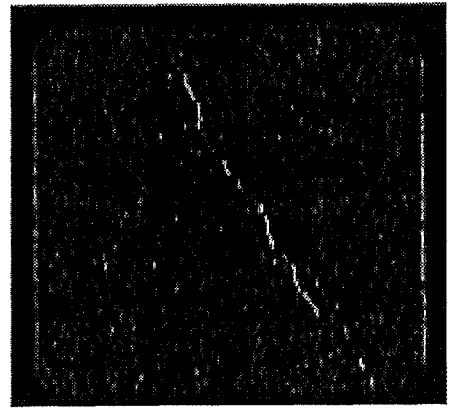
Figure 18:
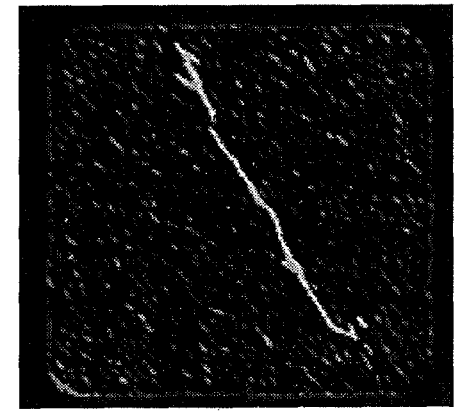
Figure 19:
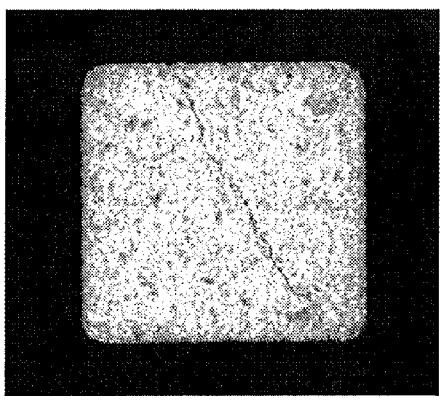
FIG. 19(a) is a diagram showing an input image.
FIG. 19(b) is a diagram showing an inspection result image according to the present invention.
Figure 19:
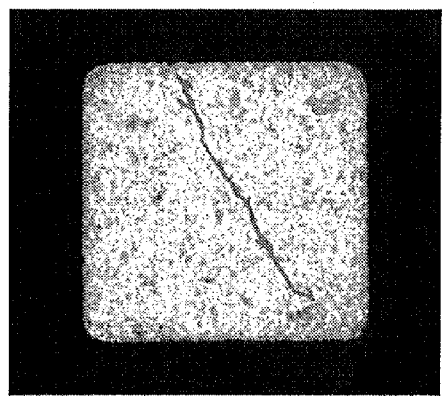
Figure 20:
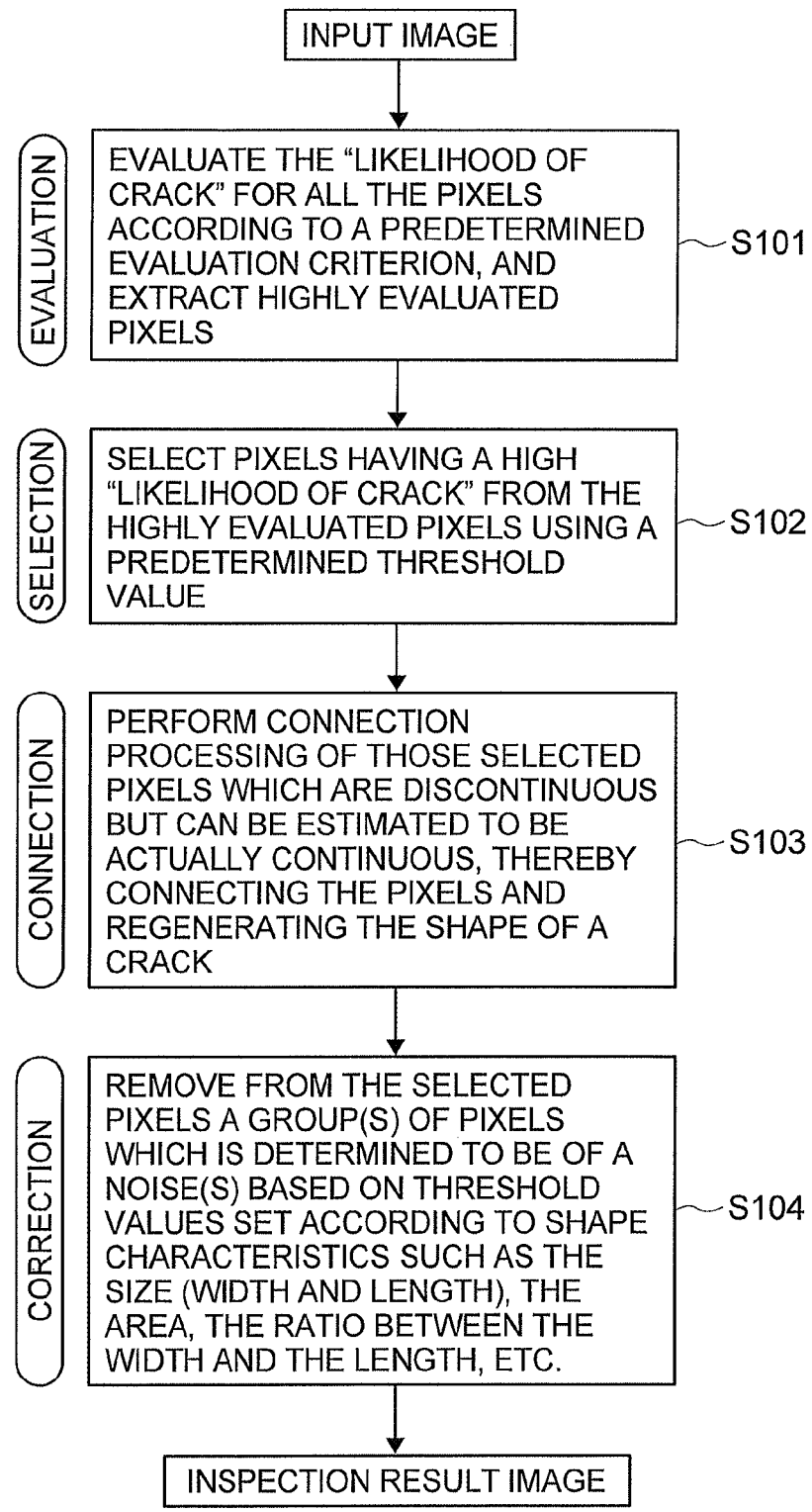
FIG. 20 is a flow chart of a conventional defect inspection method.

FIG. 16 illustrates an example of the connection step performed for the 135-degree direction.

Referring to FIG. 16, the connection step comprises closing processing performed by carrying out expansion processing of an input image, followed by contraction processing of the resulting image.

In FIG. 16, the pixels with dark hatching represent selection pixels. The selection pixels are subjected to expansion processing using a structural element Y as follows: The origin point Y6 of the structural element Y is put on each selection pixel to expand the pixel by the structural element Y, thereby obtaining expanded pixels.

The resulting expanded pixels are shown by light hatching and starred hatching.

Next, the expanded pixels are subjected to contraction processing using the structural element Y as follows: The origin point Y6 of the structural element Y is put on each of the expanded pixels and, when the structural element Y lies within the area of the expanded pixels, the pixel on which the origin point Y6 of such structural element Y lies is left. When part of the structural element Y lies outside the area of the expanded pixels, the pixel on which the origin point Y6 of such structural element Y lies is deleted.

By the contraction processing, the pixels with starred hatching are left, while the other expanded pixels are deleted.

More specifically, when the origin point Y6 of the structural element Y is put on the pixel with the coordinates (8, 8), the whole structural element Y lies in the area of the expanded pixels. Therefore, the pixel (8, 8) is not deleted. On the other hand, when the origin point Y6 of the structural element Y is put on the pixel with the coordinates (8, 9), pixel coordinates (5, 7), (6, 8) and (7, 9), constituting part of the structural element Y, lies outside the area of the expanded pixels. Therefore, the pixel (8, 9) is deleted by the contraction processing.

The selection pixels will not be deleted if a structural element Y of the same shape is used in both the expansion processing and the contraction processing.

The connection step performed in the above-described manner can prevent overlooking of a crack and false detection of noises.

The results of the multistage selection performed for each of the four directional components are shown, together with the connection directions, in FIGS. 17(a) through 17(d). The results of the connection step performed for each of the four directional components are shown in FIGS. 18(a) through 18(d).

(Synthesis Step and Correction Step)

After completion of the connection step for the selection pixels, the connection result images obtained for the respective directional components are superimposed and synthesized. In the subsequent correction step, a group(s) of pixels, which is determined to be of a noise(s) based on threshold values set according to shape characteristics such as the size (width and length), the area, the ratio between the width and the length, etc., is removed from the connection result images.

FIG. 19(a) shows the input image, and FIG. 19(b) shows the final inspection result image. Thus, the inspection method according to the present invention can clearly detect a crack which is difficult to detect by the conventional method.

As described hereinabove, according to this embodiment, the use of the "valley method" in the evaluation step can securely extract pixels having a high "likelihood of crack" and can prevent false extraction of a noise, etc. as a crack. The multistage selection in the selection step can prevent false selection of a noise and overlooking of pixels having a high "likelihood of crack". By scanning an inspection object image in each of the 0-degree direction, 45-degree direction, 90-degree direction and 135-degree direction in the evaluation step, a crack whose formation direction is unknown can be securely detected in a direction nearest to the formation direction. In addition, in the connection step, connection of pixels in a direction perpendicular to a crack can be avoided. This can prevent false connection to a noise and overlooking of a crack-related pixel. A continuous crack can be regenerated by superimposing and synthesizing the connection result images for the respective directions. Thus, surrounding fine noises can be securely removed based on threshold values set according to shape characteristics such as the size, the area, the ratio between the width and the length, etc.

In the above embodiment a shot image ("input image" in FIG. 1) is scanned in the 0-degree direction, 45-degree direction, 90-degree direction and 135-degree direction in the evaluation step, and the results of the connection step for the four directions are superimposed and synthesized before the correction step. However, in the case of an inspection object with a crack whose formation direction is known, e.g. an inspection object with a crack formed nearly in the 45-degree direction, it is possible to narrow the scanning direction down to a plurality of directions including the 135-degree direction which is perpendicular to the 45-degree direction in which the crack is formed. Similarly, in the case where a crack is known to be formed nearly in the 0-degree direction or in the 90-degree direction, the scanning direction can be narrowed down to the 90-degree direction or the 0-degree direction, perpendicular to the direction in which the crack is formed.

In the above described embodiment a group(s) of pixels, which is determined to be of a noise(s) based on threshold values set according to shape characteristics such as the size (width and length), the area, the ratio between the width and the length, etc., is removed from the connection result images. The shape characteristics for setting threshold values are not limited to the size (width and length), the area and/or the ratio between the width and the length.

DESCRIPTION OF THE REFERENCE NUMERALS

M attention pixel
K, O first adjacent pixel
C, W second adjacent pixel
A, E, U, Y third adjacent pixel

What is claimed is:

1. A defect inspection method comprising the steps of:
shooting the surface of an inspection object to obtain a shot image comprising pixels;
scanning the shot image in each of a plurality of predetermined directions independently using a dedicated scanning filter for each direction, and assigning a high evaluation value to a pixel of the shot image for each of the plurality of scanning directions when the luminance of the pixel is higher than the luminances of first adjacent pixels located on both sides of the pixel in the scanning direction and, in addition, the luminance of each of second adjacent pixels, located on both sides of the pixel in a direction perpendicular to the scanning direction, is higher than the luminances of third adjacent pixels located on both sides of the second adjacent pixel in the scanning direction;
selecting selection pixels based on the evaluation values of the pixels for each of the plurality of scanning directions;
connecting the selection pixels for each of the plurality of scanning directions; and
synthesizing the selection pixels of the predetermined scanning directions, and removing those pixels which do not meet the requirement for a predetermined shape from the selection pixels.

2. A defect inspection method comprising the steps of:
shooting the surface of an inspection object to obtain a shot image comprising pixels;
scanning the shot image in each of a plurality of predetermined directions independently using a dedicated scanning filter for each direction, and assigning a high evaluation value to a pixel of the shot image for each of the plurality of scanning directions when the luminance of the pixel is lower than the luminances of first adjacent pixels located on both sides of the pixel in the scanning direction and, in addition, the luminance of each of second adjacent pixels, located on both sides of the pixel in a direction perpendicular to the scanning direction, is lower than the luminances of third adjacent pixels located on both sides of the second adjacent pixel in the scanning direction;
selecting selection pixels based on the evaluation values of the pixels for each of the plurality of scanning directions;
connecting the selection pixels for each of the plurality of scanning directions; and
synthesizing the selection pixels of the predetermined scanning directions, and removing those pixels which do not meet the requirement for a predetermined shape from the selection pixels.

3. The defect inspection method according to claim 1, wherein in the step of selecting selection pixels, pixels having an evaluation value higher than a first threshold value are selected as primary selection pixels, and pixels having an evaluation value higher than a second threshold value which is lower than the first threshold value are selected as secondary selection pixels, and, of the secondary selection pixels, those pixels which lie adjacent to the primary selection pixels and those pixels which lie adjacent to the adjacent pixels are changed to primary selection pixels.

4. The defect inspection method according to claim 1, wherein in the step of connecting the selection pixels, the selection pixels are connected by carrying out expansion processing or contraction processing.

5. The defect inspection method according to claim 1, wherein the dedicated scanning filter is a 0-degree direction scanning filter, a 45-degree direction scanning filter, a 90-degree direction scanning filter or a 135-degree direction scanning filter.

6. The defect inspection method according to claim 2, wherein in the step of selecting selection pixels, pixels having an evaluation value higher than a first threshold value are selected as primary selection pixels, and pixels having an evaluation value higher than a second threshold value which is lower than the first threshold value are selected as secondary selection pixels, and, of the secondary selection pixels, those pixels which lie adjacent to the primary selection pixels and those pixels which lie adjacent to the adjacent pixels are changed to primary selection pixels.

7. The defect inspection method according to claim 2, wherein in the step of connecting the selection pixels, the selection pixels are connected by carrying out expansion processing or contraction processing.

8. The defect inspection method according to claim 3, wherein in the step of connecting the selection pixels, the selection pixels are connected by carrying out expansion processing or contraction processing.

9. The defect inspection method according to claim 2, wherein the dedicated scanning filter is a 0-degree direction scanning filter, a 45-degree direction scanning filter, a 90-degree direction scanning filter or a 135-degree direction scanning filter.

10. The defect inspection method according to claim 3, wherein the dedicated scanning filter is a 0-degree direction scanning filter, a 45-degree direction scanning filter, a 90-degree direction scanning filter or a 135-degree direction scanning filter.

11. The defect inspection method according to claim 4, wherein the dedicated scanning filter is a 0-degree direction scanning filter, a 45-degree direction scanning filter, a 90-degree direction scanning filter or a 135-degree direction scanning filter.

* * * * *